(12) United States Patent
Uman et al.

(10) Patent No.: US 12,473,220 B2
(45) Date of Patent: Nov. 18, 2025

(54) SYSTEMS AND METHODS FOR TREATING A WASTEWATER STREAM

(71) Applicant: UNIVERSITY OF SOUTH FLORIDA, Tampa, FL (US)

(72) Inventors: Ahmet Erkan Uman, Tampa, FL (US); Daniel H. Yeh, Tampa, FL (US); Robert Alonso Bair, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 429 days.

(21) Appl. No.: 18/002,837

(22) PCT Filed: Jun. 25, 2021

(86) PCT No.: PCT/US2021/039226
§ 371 (c)(1),
(2) Date: Dec. 21, 2022

(87) PCT Pub. No.: WO2021/263191
PCT Pub. Date: Dec. 30, 2021

(65) Prior Publication Data
US 2023/0242429 A1    Aug. 3, 2023

Related U.S. Application Data

(60) Provisional application No. 62/705,416, filed on Jun. 25, 2020.

(51) Int. Cl.
*C02F 1/44* (2023.01)
*B01D 21/00* (2006.01)
(Continued)

(52) U.S. Cl.
CPC ............ *C02F 9/00* (2013.01); *B01D 21/0042* (2013.01); *B01D 61/149* (2022.08); *C02F 1/444* (2013.01);
(Continued)

(58) Field of Classification Search
CPC .. C02F 9/00; C02F 1/444; C02F 1/463; C02F 1/5227; C02F 3/2846; C02F 3/2853;
(Continued)

(56) References Cited

U.S. PATENT DOCUMENTS 5,558,775 A * 9/1996 Busch, Jr. ................. C02F 9/00
                                                    210/651
8,790,517 B2 * 7/2014 Wiemers .................. C02F 1/463
                                                    210/663
(Continued)

FOREIGN PATENT DOCUMENTS

CA      2694170 A1 *  2/2009   ......... B01D 19/0036
CN    106630416 A     5/2017
(Continued)

OTHER PUBLICATIONS

International Search Report of Related PCT/US2021/039226 mailed Nov. 30, 2021, 4 pages.
(Continued)

*Primary Examiner* — Joseph W Drodge
(74) *Attorney, Agent, or Firm* — HUSCH BLACKWELL LLP

(57) ABSTRACT

Provided herein are systems and methods for treating a wastewater stream. In one embodiment, a wastewater stream is treated using a settling tank, a membrane feed tank, and at least one filtration unit.

13 Claims, 5 Drawing Sheets

(51) Int. Cl.
  *B01D 61/14* (2006.01)
  *C02F 1/46* (2023.01)
  *C02F 1/463* (2023.01)
  *C02F 1/52* (2023.01)
  *C02F 3/28* (2023.01)
  *C02F 3/32* (2023.01)
  *C02F 9/00* (2023.01)
  *C02F 1/00* (2023.01)

(52) U.S. Cl.
  CPC ............ *C02F 1/463* (2013.01); *C02F 1/5227* (2013.01); *C02F 3/2846* (2013.01); *C02F 3/2853* (2013.01); *C02F 3/322* (2013.01); *C02F 2001/007* (2013.01); *C02F 2203/002* (2013.01); *C02F 2209/40* (2013.01)

(58) Field of Classification Search
  CPC .............. C02F 3/322; C02F 2001/007; C02F 2203/002; C02F 2209/40; C02F 1/283; C02F 1/5245; C02F 1/56; C02F 2301/046; C02F 3/1268; C02F 3/28; Y02E 50/30; B01D 21/0039; B01D 21/0042; B01D 21/0035; B01D 21/0051; B01D 61/146; B01D 61/149; B01D 61/16; B01D 61/20; B01D 61/58; B01D 2311/2628; B01D 2311/2464; B01D 2311/2649; B01D 21/0045
  USPC .......................................... 210/241
  See application file for complete search history.

(56) References Cited

U.S. PATENT DOCUMENTS

| | | | |
|---|---|---|---|
| 8,808,537 B1* | 8/2014 | Livingston | C02F 9/20 |
| | | | 210/260 |
| 2008/0116130 A1 | 5/2008 | Devine | |
| 2011/0049054 A1* | 3/2011 | Merryman | C02F 1/441 |
| | | | 210/652 |
| 2013/0075333 A1* | 3/2013 | Pruet | B01D 71/024 |
| | | | 210/640 |
| 2013/0233800 A1 | 9/2013 | Conner et al. | |
| 2015/0060360 A1 | 3/2015 | Motherway et al. | |
| 2016/0201152 A1* | 7/2016 | Medoff | C12P 19/02 |
| | | | 127/55 |
| 2017/0210656 A1* | 7/2017 | Hancock | B01D 61/362 |
| 2018/0016171 A1* | 1/2018 | Yeh | C02F 3/2853 |
| 2018/0170769 A1 | 6/2018 | Wright | |

FOREIGN PATENT DOCUMENTS

| | | |
|---|---|---|
| WO | 2004/096866 A2 | 11/2004 |
| WO | 2018/163047 A1 | 9/2018 |
| WO | 2021/263191 A1 | 12/2021 |

OTHER PUBLICATIONS

Written Opinion of Related PCT/US2021/039226, mailed Nov. 30, 2021, 6 pages.

European Search Report of related application No. 21828913.0, mailed May 21, 2024, 8 pages.

* cited by examiner

SYSTEMS AND METHODS FOR TREATING A WASTEWATER STREAM

CROSS-REFERENCE TO RELATED APPLICATION

This application is a national stage filing under 35 U.S.C. § 371 of International Application No. PCT/US2021/039226, filed on Jun. 25, 2021, which claims priority to U.S. Provisional Application No. 62/705,416 filed on Jun. 25, 2020, the entire contents of all of which are incorporated herein by reference.

STATEMENT CONCERNING FEDERALLY SPONSORED RESEARCH OR DEVELOPMENT

Not applicable.

BACKGROUND

The notion that the wastewater (WW) is considered as "waste" and only treated instead of recovered must change due to our perspective to achieve a sustainable future. In this perspective, WW can be a resource for water, nutrients, and energy. With an estimated 2.5 kWh/$m^3$ potential chemically bound energy and 35 Mt of nitrogen per year (assuming 10 gram/person/day on average globally) in WW, WWTPs can be net renewable energy producers and perfect medium for nutrient recovery. However, energy intensive activated sludge process, which can use between 0.3 to 1.89 kWh/$m^3$ energy, is still continued to be used which degrades the potentially recoverable organics into carbon dioxide and water.

There is a need in the art to develop technologies that are energy efficient and that can enable an increased water, nutrients, and energy recovery from the treatment process.

SUMMARY OF THE INVENTION

Some embodiments of the present disclosure provides a wastewater treatment system. The wastewater treatment system includes a settling tank having an inlet configured to receive an inlet wastewater stream, a plurality of baffles or tubes disposed in an interior space of the settling tank, a solids outlet disposed near a bottom end of the settling tank, and a supernatant outlet disposed above the solids outlet. The wastewater treatment system further includes a membrane feed tank. The membrane feed tank includes an inlet configured to receive supernatant liquid from the settling tank, a solids outlet disposed near a bottom end of the membrane feed tank, and a fluid outlet disposed above the solids outlet. The wastewater treatment system further includes a filtration unit. The filtration unit includes a filtration inlet configured to receive supernatant liquid from the membrane feed tank, porous filtration media disposed to separate the filtration unit into a permeate side that allows permeate to exit the filtration unit through a permeate outlet and a retentate side that allows retentate to exit the filtration unit through a retentate outlet. The membrane feed tank further includes a second fluid inlet configured to receive retentate from the filtration unit.

In some embodiments, the present disclosure provides a method. The method includes (i) feeding wastewater to a settling tank that separates the wastewater into a concentrate stream and a supernatant stream, where the concentrate stream exits the settling tank through a solids outlet disposed near a bottom end of the settling tank, and where the supernatant stream exits the settling tank through a supernatant outlet disposed above the solids outlet. The method further includes (ii) feeding the supernatant stream to a membrane feed tank that separates the supernatant stream into a second concentrate stream and a second supernatant stream, where the second concentrate stream exits the membrane feed tank through a solids outlet disposed near a bottom end of the membrane feed tank, and where the supernatant stream exits the membrane feed tank through a fluid outlet disposed above the solids outlet. The method further includes (iii) feeding the second supernatant stream to a filtration unit comprising porous filtration media that separates the second supernatant stream into a permeate stream and a retentate stream, where the retentate stream exiting the filtration unit is recycled back to the membrane feed tank.

These and other advantages and features of the invention will become more apparent from the following detailed description of the preferred embodiments of the invention when viewed in conjunction with the accompanying drawings.

DETAILED DESCRIPTION

Figure 1:
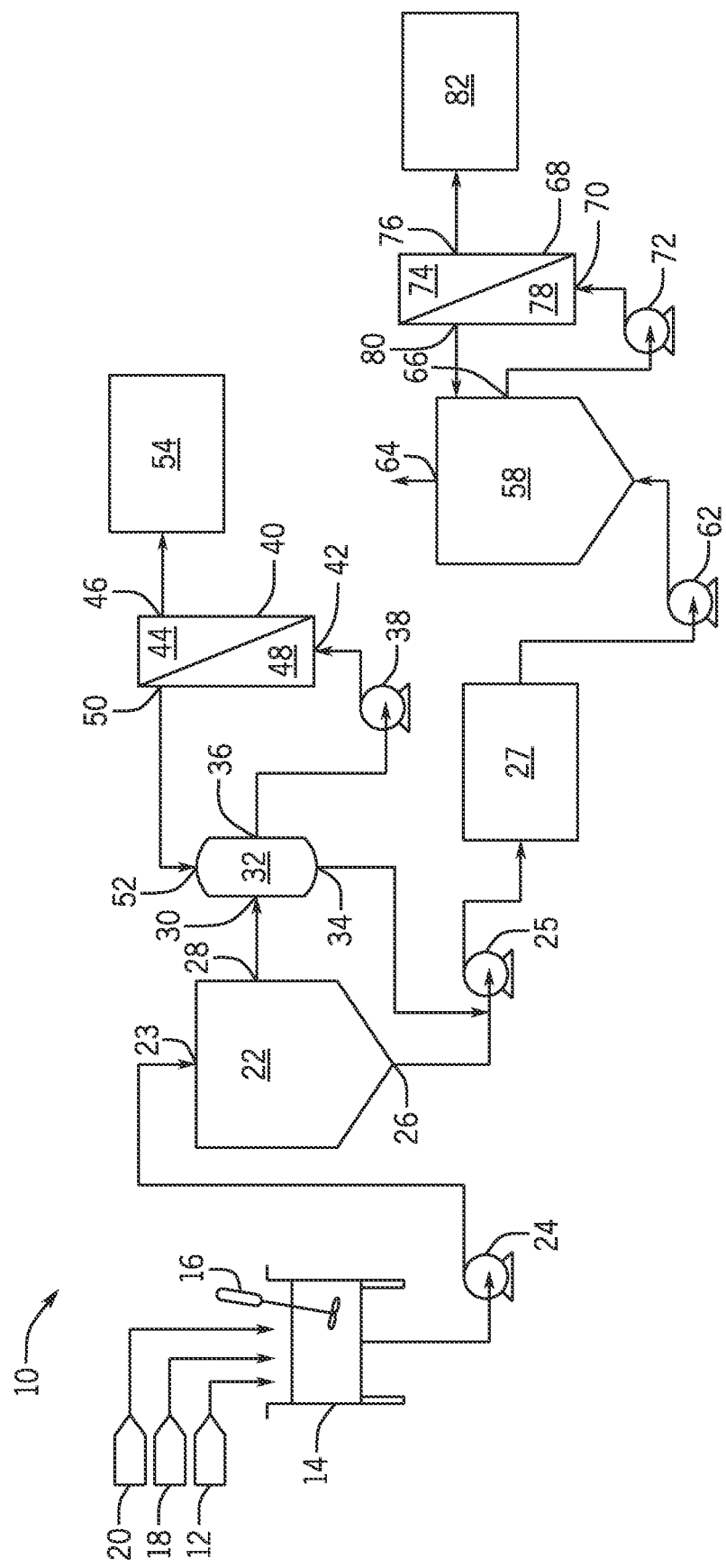
FIG. 1 is a schematic illustration of an exemplary wastewater treatment system in accordance with aspects of the present disclosure.
Figure 2:
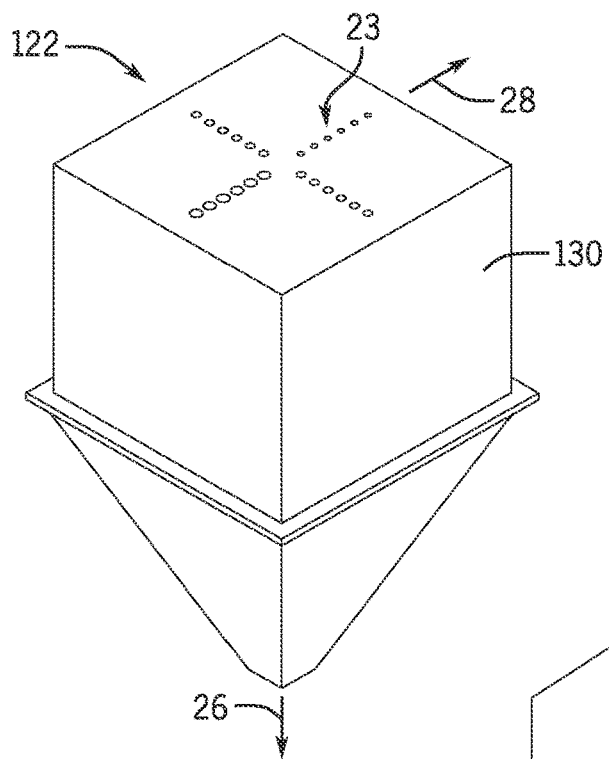
FIG. 2 is a perspective view of a schematic illustration of a settling tank in accordance with aspects of the present disclosure.
Figure 3:
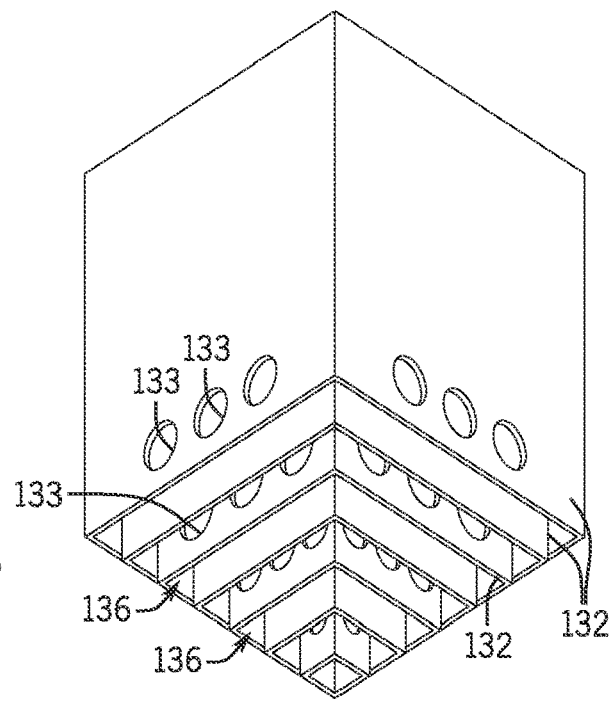
FIG. 3 is a perspective view of a schematic illustration of concentric baffles used in the settling tank of FIG. 2.
Figure 4:
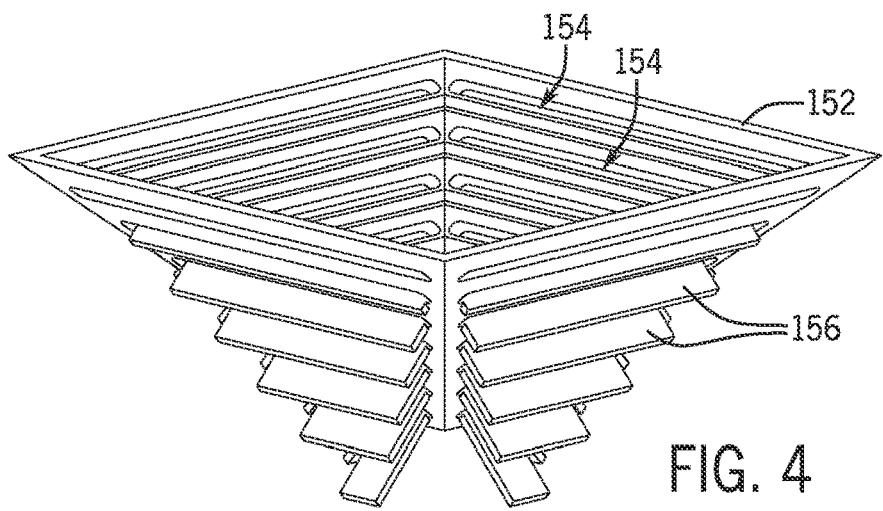
FIG. 4 is a perspective view of a schematic illustration of a base member used in the settling tank of FIG. 2.

The following discussion is presented to enable a person skilled in the art to make and use embodiments of the invention. Given the benefit of this disclosure, various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

FIG. 1 illustrates a wastewater treatment system 10 for treating a wastewater fluid stream 12. As used herein, the term "wastewater" may refer to used or spent water from any combination of domestic, industrial, commercial or agricultural activates, surface runoff, storm water, or any sewer inflow or sewer infiltration. In some embodiments, the wastewater stream 12 includes water that has been contaminated by human use. In some embodiments, the wastewater treatment system 10 includes a feed preparation tank 14 that is in fluid communication with the wastewater stream 12. In some embodiments, the feed preparation tank 14 includes an agitator 16 for mixing the wastewater stream 12 in the feed preparation tank 14. In some embodiments, the feed preparation tank 14 is in fluid communication with a sedimentation reagent unit 18 that includes a vessel that comprises a chemical reagent that promotes sedimentation, such as a flocculent, a coagulant, a polyelectrolyte, or a combination thereof.

As used herein, the term "flocculants" may refer to chemical compounds or entities that promote flocculation. Flocculation may induce colloids and other suspended particles in the wastewater stream 12 to aggregate, forming a "floc" that settles and separates from the wastewater stream 12. Exemplary flocculants include, but are not limited to, ferric chloride ($FeCl_3$), aluminum sulfate $Al_2(SO_4)_3$, and organic polyelectrolytes, such as polysaccharide gums, or synthetic polyelectrolytes.

As used herein, the term "polyelectrolyte" may refer to polymers whose repeating units bear an electrolyte group, such as polyanions and polycations. Polyelectrolytes may facilitate both coagulation and flocculation of the wastewater stream 12.

As used herein, the term "coagulants" may refer to chemical compounds or entities that react with charged impurities within the wastewater stream 12 to neutralize the impurities or particles. Neutralizing the impurities or particles via a coagulant promotes sedimentation and clumping of the particles. Exemplary coagulants include, but are not limited to, iron-based or aluminum-based ions, such as aluminum sulfate, aluminum chloride, polyaluminum chloride, sodium aluminate, ferric sulfate, ferrous sulfate, and ferric chloride, or lime ($Ca(OH)_2$ or $CaO$).

In some embodiments, the feed preparation tank 14 is in fluid communication with a scouring reagent unit 20 that includes a vessel that comprises a scouring reagent. Scouring reagents are useful for controlling fouling on filtration media within the wastewater treatment system 10. The scouring reagents facilitate breaking down dynamic membrane and soluble organics that become entrained or fouled on filtration media in the system 10. Suitable scouring reagents include, but are not limited to, activated carbon (AC), granular activated carbon (GAC), powdered activated carbon (PAC) and magnetic ion exchange resin (MIEX)

Although the sedimentation reagent unit 18 and the scouring reagent unit 20 are depicted as being in fluid communication with the feed preparation tank 14, it is to be appreciated that the sedimentation reagent unit 18 may be in fluid communication with any process unit in the wastewater treatment system 10, and particularly with the settling tank 22, the membrane feed tank 32, the first filtration unit 40, the second filtration unit 70, or combinations thereof.

In some embodiments, the wastewater treatment system 10 includes a settling tank 22 having an inlet 23 configured to receive an inlet wastewater stream 12. A pump 24 may transport the wastewater stream 12 from the feed preparation tank 14 to the settling tank 22. In some embodiments, the pump 24 transports the wastewater stream 12 directly to the settling tank 22 without passing through the feed preparation tank 14.

The settling tank 22 is configured to separate the wastewater stream 12 into a first concentrate stream and a supernatant stream. The concentrate stream includes an increased concentration of solids and particulate matter (e.g., colloids) relative to the supernatant stream. The concentrate stream exits the settling tank 22 through a solids outlet 26 disposed near a bottom end of the settling tank 22. The concentrate stream may exit the settling tank 22, and be placed in fluid communication with a concentrate feed tank 27. A pump 25 may transport the concentrate stream from the solids outlet 26 to the concentrate feed tank 27. The supernatant stream exits the settling tank 22 through a supernatant outlet 28 disposed above the solids outlet 26. Alternatively, pump 25 may be replaced by one or more valve (e.g., solenoid valve) that opens and closes in response to a command from a control system. When the valve is open, fluid flows from 26 to 27 due to hydrostatic pressure in the settling tank 22.

The settling tank 22 may include various features to help enhance sedimentation of solids and particulate matter from the wastewater stream 12. For example, the settling tank 22 may include baffles or tubes disposed in the interior space of the settling tank 22, and an agitator (e.g., mixing blades, recirculation pumps, etc.) to facilitate mixing.

In some embodiments, the settling tank 22 includes an electrocoagulation unit (not shown) that produces coagulants through electrolytic oxidation.

Referring to FIGS. 2-6, exemplary settling tanks 122, 222 are depicted according to various aspects of the present disclosure. Referring particularly to FIGS. 2-5, a concentrically baffled settling tank 122 is depicted in accordance to aspects of the present disclosure. As shown, the concentrically baffled settling tank 122 includes a container or housing 130. Within the housing 130 of the settling tank 122 are concentric baffles 132 within a central baffle section 134 of the settling tank 122. The baffles 132 may have a variety of geometries (e.g., square, rectangular, cylindrical, etc). The baffles 132 form sedimentation zones 136 in spaces between the baffles 132. The sedimentation zones 136 help promote sedimentation and fluid mixing. Each baffle 132 may have at least one opening 133 that places adjacent sedimentation zones 136 in fluid communication with one another. Positioned below the baffles 132 is a lower compartment 138 and positioned above the baffles 132 is an upper compartment or headspace 140. Positioned in the headspace 140 is a motor 142 that drives a shaft 144. Mounted to a distal end of the shaft 144 is an impeller 146. The impeller 146 may rotate during operation to promote mixing and agitation in the settling tank 122.

During operation of the settling tank 122, the wastewater stream 12 is fed to the inlet 23, which transports the wastewater stream 12 to the headspace 140. A top 148 of the baffle section 134 includes channels 150 that place the headspace 140 in fluid communication with the sedimentation zones 136. As sedimentation occurs, solids fall within the sedimentation zones 136 toward a base 152 of the baffle section 134. The base 152 may be conical in design such that the height of the baffles 132 decreases from the center to the perimeter of the settling tank 122. Channels 154 may be configured in the base 152 to place the sedimentation zones 136 in fluid communication with the lower compartment 138. Solids accumulate in the lower compartment 138 and may exit the settling tank 122 through a solids outlet 26. The supernatant outlet 28 may be positioned within the baffle section 134 and may be in fluid communication with one or more of the sedimentation zones 136.

In some embodiments, the base 152 further includes hangers 156 that extend from the base 152 to partially cover the channels 154. For example, the hangers 156 may extend from the base 152 at an angle to impede or prevent solids that have accumulated within the lower compartment 138 from returning to the sedimentation zones 136. Although operation was described in a top-down orientation, the settling tank 122 may also be operated such that the wastewater stream 12 is fed to the lower compartment 38.

Figure 6:
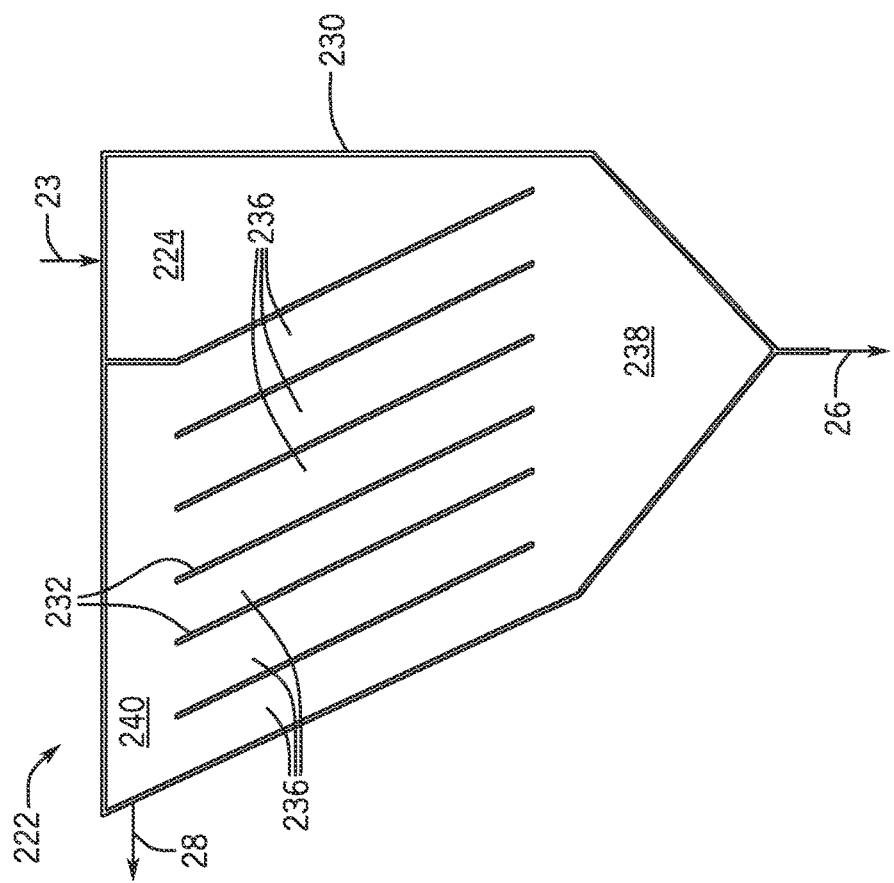
FIG. 6 is a cross-sectional, schematic illustration of a Lamella settling tank in accordance with aspects of the present disclosure.
Figure 5:
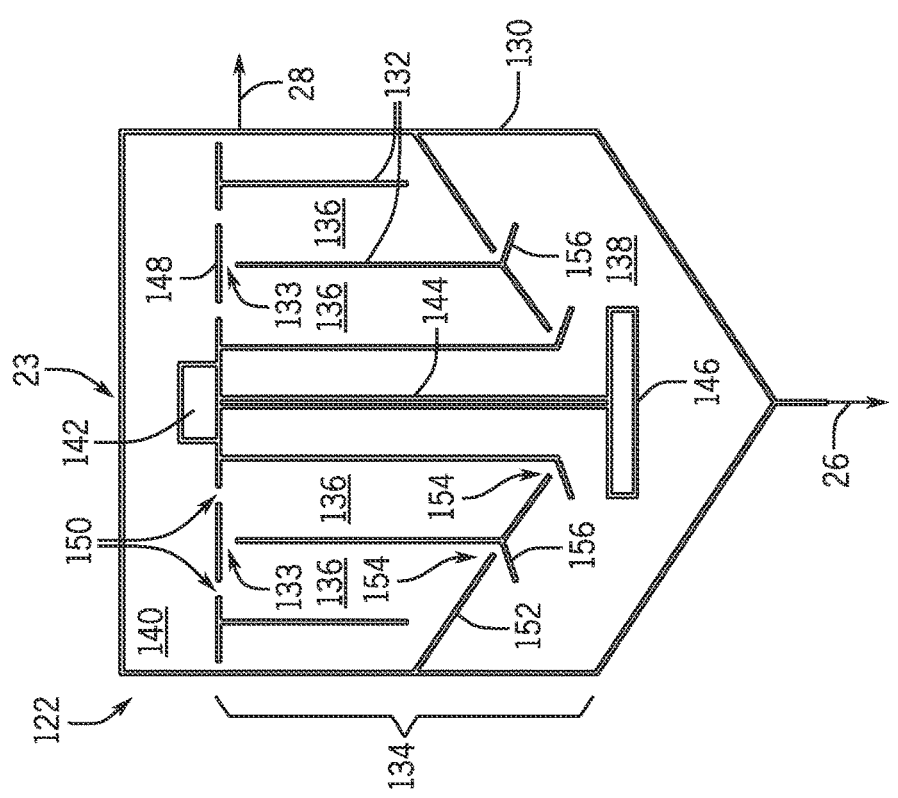
FIG. 5 is a cross-sectional, schematic illustration of the settling tank of FIG. 2.

Referring to FIG. 6, a Lamella settling tank 222 is depicted in accordance with some embodiments of the present disclosure. The Lamella settling tank includes a housing 230 having a series of inclined baffles 232 disposed therein. The inclined baffles 232 separate the interior space of the Lamella settling tank 222 into an inlet zone 224, a lower compartment 238, and an upper compartment 240. In some embodiments, the inclined baffles 232 are a bundle of inclined tubes. During operation, the wastewater stream 12 enters the inlet 23 at a top end of the settling tank 222 and is transported from the inlet zone 224 to the lower compartment 238. The fluid then beings to travel from the lower compartment 238 through sedimentations zones 236 formed by spaces between the inclined baffles 232 toward the upper compartment 240. Sedimentation occurs in the sedimentation zones 236, and solids fall to the lower compartment 238 and exit the settling tank 22 through the solids outlet 26. Supernatant is transported to the upper compartment 240 and exits the settling tank 22 through the supernatant outlet 28.

Referring back to FIG. 1, the supernatant exiting the settling tank 22 is placed in fluid communication with an inlet 30 of a membrane feed tank 32. In some embodiments, the membrane feed tank 32 includes a solids outlet 34 disposed near a bottom end of the membrane feed tank 32, and a fluid outlet 36 disposed above the solids outlet 34. The membrane feed tank 32 is configured to separate the supernatant stream exiting the settling tank 22 into a second supernatant stream that exits the membrane feed tank 32 through the fluid outlet 36. The membrane feed tank 32 further separates the supernatant stream exiting the settling tank 22 into a second concentrate stream that exits the membrane feed tank 32 through the solids outlet 34. The second concentrate stream leaving the membrane feed tank 32 may be optionally combined with the first concentrate stream exiting the settling tank 22 prior to being sent to the concentrate feed tank 27. One or more pump 25, or valves, may transport the first and second concentrate streams to the concentrate feed tank 27.

In some embodiments, the membrane feed tank 32 includes an electrocoagulation unit (not shown) that produces coagulants through electrolytic oxidation, to further promote the removal of solids through the solids outlet 34.

Figure 7:
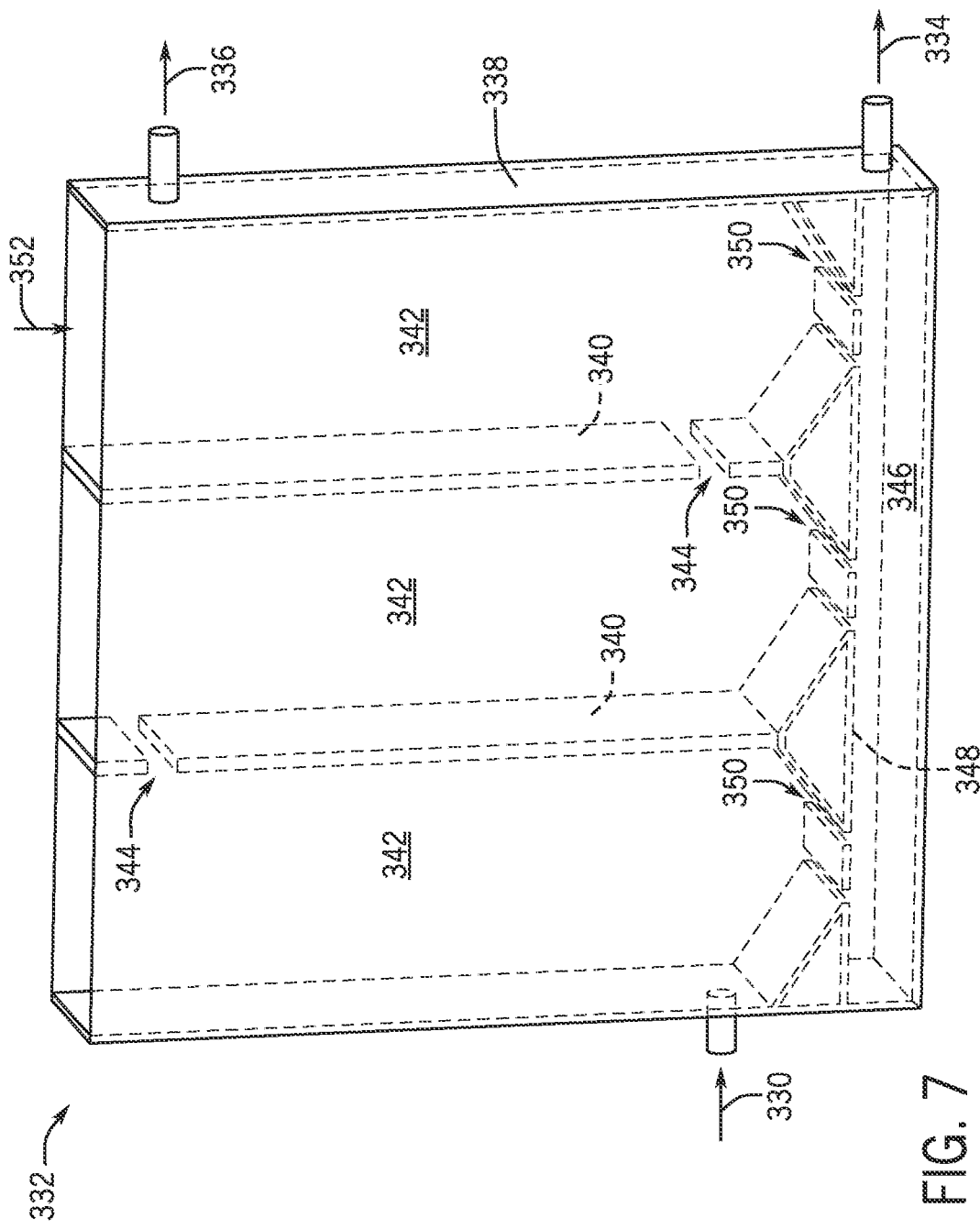
FIG. 7 is a perspective view of a schematic illustration of a membrane feed tank in accordance with aspects of the present disclosure.

Referring to FIG. 7, an exemplary membrane feed tank 332 is depicted according to various aspects of the present disclosure. The membrane feed tank 332 includes a housing 338. The housing 338 includes an inlet 330 that is configured to receive the supernatant stream exiting the settling tank 22, a solids outlet 334 disposed near a bottom end of the membrane feed tank 332, a fluid outlet 336 disposed above the solids outlet 334 that is configured to allow a second supernatant stream to exit the membrane feed tank 332, and a second fluid inlet 352 that is configured to receive a retentate stream exiting the filtration unit 40.

Within the housing 338, the membrane feed tank 332 includes baffles 340 that form sedimentation zones 342. The housing 338 may include any number of sedimentation zones 342 formed by spaces between the baffles 340 (e.g., at least 2, at least 3, at least 4, at least 5, at least 10, less than 20, less than 100, etc.). In some embodiments, the baffles 340 extend vertically between a top end towards a bottom end of the housing 338. In some embodiments, the top end of the baffles 340 are coupled with a top, internal surface of the housing 338. In some embodiments, the top end of the baffles 340 is in direct contact with the top, internal surface of the housing 338. Although the baffles 340 are illustrated to extend vertically 340, the baffles may be extend within the housing 338 at an angle (e.g., may be sloped rather than parallel to straight walls of the housing 338).

Each baffle 340 includes at least one opening 344 that places adjacent sedimentation zones 342 in fluid communication with one another. The location of the opening 344 for each baffle 340 may alternate from being located on a top end for a first baffle 340, to being located on a bottom end of an adjacent, second baffle 340. In this way, fluid will be directed upwards in the first sedimentation zone 342 and subsequently downwards in the adjacent sedimentation zone 342, thereby enhancing mixing and sedimentation within the membrane feed tank 332.

Positioned below the baffles 340 is a lower compartment 346 that is separated from the sedimentation zones 342 by a base 348 that extends along a width of the housing 332. In some embodiments, the baffles 340 extend from a top surface of the base 348 to the top, internal surface of the housing 332. In some embodiments, the base 348 extends along a width of the housing, and is coupled to internal, sidewall surfaces of the housing 332. In some embodiments, the base 348 is in direct contact with the internal, sidewall surfaces of the housing 332. The base 348 includes channels 350 that place the sedimentation zones 342 in fluid communication with the lower compartment 346. In some embodiments, a top surface of the base 348 has a conical or trapezoidal shape to help direct sediment towards the lower compartment 346. The solids outlet 334 may be in fluid communication with the lower compartment 346. The fluid outlet 336 may be in fluid communication with a sedimentation zone 342 on an opposite side of the housing 332 relative to the inlet 330. In some embodiments, the fluid outlet 336 is located on the same side of the housing 332 as the solids outlet 334. In some embodiments, the second fluid inlet 352 is in fluid communication with the same sedimentation zone as the fluid outlet 336. However, the second fluid inlet 352 may be in fluid communication with any sedimentation zone 342. In some embodiments, the housing 332 further includes horizontal baffles (not shown) within the sedimentation zones. For example, when the second fluid inlet 352 is located in the same sedimentation zone 342 as the fluid outlet 336, a horizontal baffle may be disposed between the fluid outlet 336 and the second fluid inlet 352.

In some embodiments, the wastewater system 10 includes a filtration unit 40 that includes a filtration inlet 42 configured to receive the supernatant stream from the membrane feed tank 32. A pump 38 may transport the supernatant stream from the membrane feed tank 32 to the filtration inlet 42. The filtration unit 40 includes porous media disposed in the filtration unit that separates the filtration unit into a permeate side 44 that allows permeate to exit the filtration unit 40 through a permeate outlet 46, and a retentate side 48 that allows retentate to exit the filtration unit 40 through a retentate outlet 50. The permeate may be collected in the permeate feed tank 54.

In some embodiments, the porous filtration media is a membrane filter. As used herein, the term "membrane" may refer to a selective barrier that allows specific entities (such as molecules and/or ions) to pass through, while retaining the passage of others. The ability of a membrane to differentiate among entities (based on, for example, their size and/or charge and/or other characteristics) may be referred to as "selectivity." In some embodiments, the membranes described herein may be formed from synthetic or polymeric materials having pores suited for ultrafiltration or microfiltration.

As used herein, the term "ultrafiltration" or "UF" may refer to a membrane separation technique used to separate small particles and dissolved molecules in fluids. The primary basis for separation may be molecular size, although other factors, such as but not limited to, molecule shape and charge can also be a basis for separation. Molecules larger than the membrane pores will generally be retained at the surface of the membrane and concentrated during the ultrafiltration process. The retention properties of ultrafiltration membranes may be expressed as "Molecular Weight Cutoff" (MWCO). This value may refer to the approximate molecular weight (MW) of a molecule, compound and/or material (such as polymers, proteins, colloids, polysaccharides, suspended solids and/or solutes), which is about 90% or more retained by the membrane. However, a molecule's shape can have a direct effect on its retention by a membrane. For example, linear molecules like DNA may find their way through pores that will retain a globular species of the same molecular weight.

Ultrafiltration membranes may be adapted to let small molecules (such as water, low-molecular-weight organic solutes, and salts) pass, but retain high-molecular weight molecules (such as, polymers, proteins, colloids, polysaccharides, and/or suspended solids and solutes of molecular weight greater than 1,000). Ultrafiltration (UF) may also relate to a technique that utilizes membranes having pores of about 5 to 100 nanometer (nm) in diameter.

As used herein, the term "microfiltraiton" or "MF" refers to filtration media sized to separate compounds or material having a molecular weight greater than 100,000 g/mol. In some embodiments, MF membranes can filter out sediment, algae, protozoa, and large bacteria. In some embodiments MF may also relate to a technique that utilizes membranes having pores of about 0.1 to 10 μm.

In some embodiments, the retentate stream exiting the filtration unit 40 is recycled back to a second fluid inlet 52 in the membrane feed tank 32. The membrane feed tank 32 offers various advantages in the present disclosure. Particularly, Applicant has discovered that when the retentate stream exiting the filtration unit 40 is directly fed into the settling tank 22, turbulence induced from the retentate stream causes an increased concentration of solids to become entrained in the supernatant fluid. Accordingly, when the membrane feed tank 32 in not present, an increased concentration of solids is passed to the inlet stream to the filtration unit 40. This results in an increased fouling rate of the filtration media in the filtration unit 40, resulting in a higher transmembrane pressure (TMP), declining membrane flux, and an increased frequency of cleaning in order to maintain stable operation. Without being bound to any particular theory, it is contemplated that incorporating the membrane feed tank 32 reduces solid turbulence within the settling tank 22, and produces a supernatant fluid that has less solids entrained therein. This reduces the filtration burden of the downstream filtration unit 40, and results in fouling mitigation, prolonged operation before cleaning, and increased stability due to a lowered transmembrane pressure. Additionally, the membrane feed tank 32 offers additional solids separation. For example, solids and particulate matter (e.g., colloids) that are entrained in the supernatant stream exiting the settling unit can undergo further sedimentation in the membrane feed tank 32, further reducing the filtration burden of the downstream filtration unit 40.

Figure 8A:
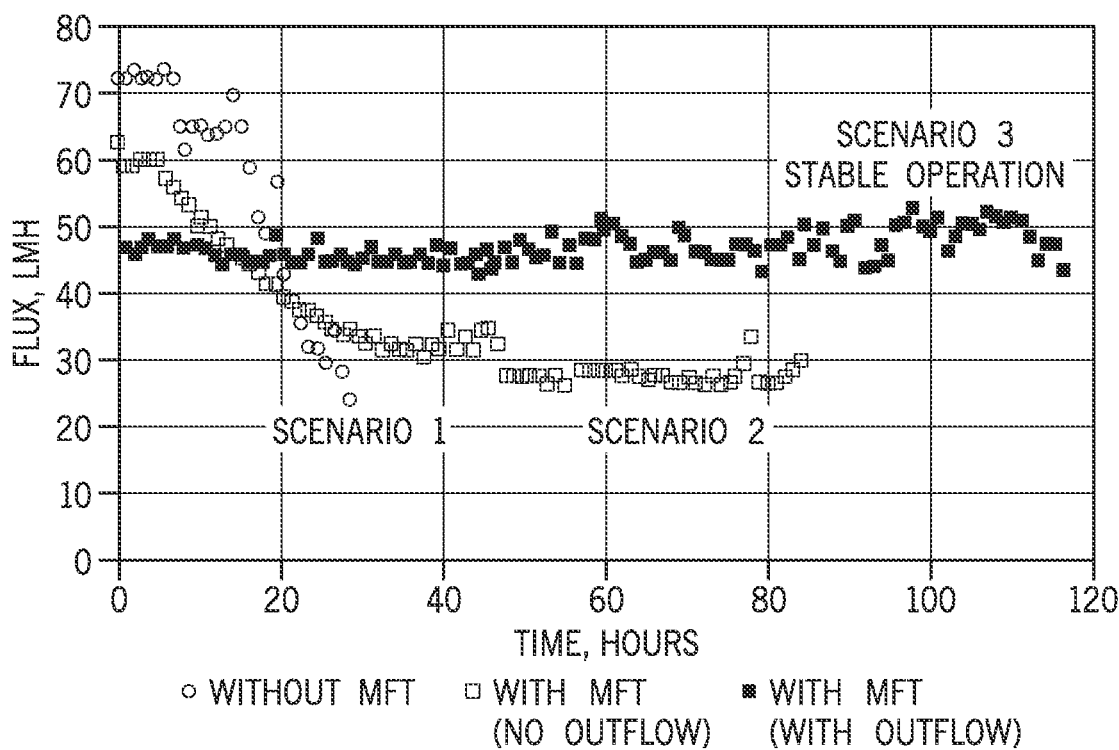
FIGS. 8(A-B) are graphs that illustrate (FIG. 8A) the effective flux (LMH) of the filtration media in the first filtration unit over a duration.
(FIG. 8B) the transmembrane pressure (TMP) of the filtration media in the first filtration unit over the duration.
Figure 8B:
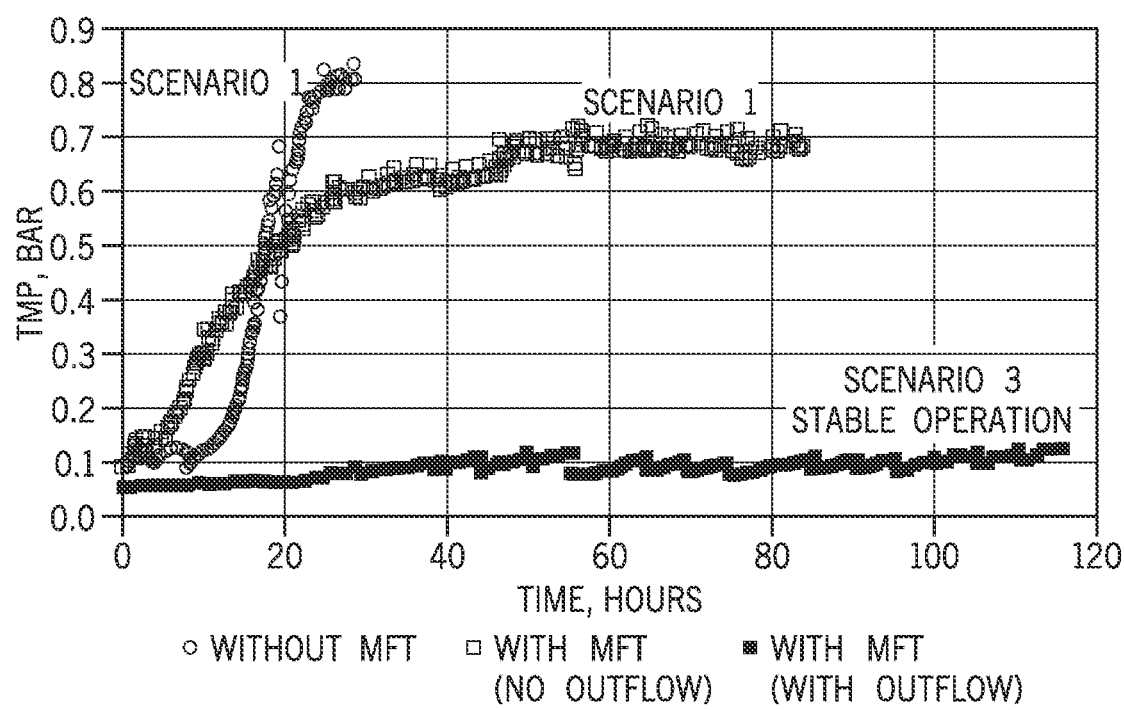

FIGS. 8(A-B) provide experimental evidence of the efficacy of the membrane feed tank 32 described above. In Scenario 1, illustrated as open circles in FIGS. 8(A-B), the membrane feed tank 32 was not present (meaning supernatant stream from settling tank 22 directly entered filtration unit 40, and the retentate stream is returned to the settling tank 22). The filtration unit 40 could only be operated for short duration (28 hr) before the flux rapidly declined and the TMP rapidly increased. In Scenario 2, illustrated as open squares in FIGS. 8(A-B), the membrane feed tank 32 was present, but the solids outlet 34 was shut. Scenario 2 offered an improvement over Scenario 1, in terms of a more gradual decline of flux and more gradual increase of TMP. However, the accumulation of solids and particulate matter (e.g., colloids) prevented stable operation, as illustrated by a decline in flux and an increase in TMP. In Scenario 3, the membrane feed tank 32 was present, and the solids outlet 34 was open, with the second concentrate stream from the membrane feed tank 32 flowing to the concentrate feed tank 27. Under this scenario, stable operation was achieved, with steady values of flux (approx. 46 liter/m$^2$/hr) and TMP (approx. 0.1 bar) even after 118 hr.

In some embodiments, the wastewater treatment system 10 includes an anaerobic membrane bioreactor (AnMBR) system 56. The AnMBR system 56 includes an anaerobic bioreactor 58 having an inlet 60 configured to receive the concentrate stream from concentration feed tank 27. A pump 62 may transport the concentrate stream from the concentrate feed tank 27 to the anaerobic bioreactor 58. In some embodiments the system 10 does not include a concentrate feed tank 27 and the concentrate feed stream from the settling tank 22 and/or the membrane feed tank 32 are placed in fluid communication with the anaerobic bioreactor 58 via one or more pump 62.

In some embodiments, the anaerobic bioreactor 58 includes one or more microorganism that breaks down biodegradable material within the solids in the absence of oxygen to produce a biogas. Exemplary microorganisms include, but are not limited to, *Pelotomaculum* sp., *Syntrophobacter* sp., *Syntrophomonas* sp., *Methanothrix* sp., *Methanosaeta* sp., and *Methanosarcina* sp. The anaerobic bioreactor 58 includes a gas outlet 64 that is configured to allow the biogas to exit the anaerobic bioreactor 58. The biogas (e.g., methane) may be collected, discarded, or used a fuel to power the wastewater treatment system 10 (e.g., a fuel to power heat exchangers in the system).

The anaerobic bioreactor 58 includes a fluid outlet 66 configured to allow fluid to exit the anaerobic bioreactor 58. In some embodiments, the AnMBR 56 includes a second filtration unit 68 having a filtration inlet 70 configured to receive the fluid from the anaerobic bioreactor 58. A pump 72 may transport the fluid from the anaerobic bioreactor 58 to the filtration inlet 70. The second filtration unit 68 includes porous media disposed in the filtration unit 68 that separates the filtration unit 68 into a permeate side 74 that allows permeate to exit the filtration unit 68 through a permeate outlet 76, and a retentate side 78 that allows retentate to exit the filtration unit 68 through a retentate outlet 80. The permeate may be collected in a second permeate feed tank 82.

Although not shown in FIG. 1, permeate generated in the permeate collection tanks 54, 82 may be further processed. For example, the system 10 may further include a algae photobioreactor, a polishing system, and a disinfection system. The algae photobioreactor removes and recovers nutrients, such as nitrogen and phosphorus, within the permeate, while the polishing system, which can use any number of processes such as reverse osmosis, ion exchange or activated carbon, removes residual carbon, salts, and turbidity. The disinfection system can use any of a number of disinfection processes, such as electrochlorination, chlorination, ultraviolet exposure, catalysis, and other advanced oxidation processes to kill pathogens within the permeate. It is noted that, in other embodiments, the algae photobioreactor can be omitted and the nutrients can be left in the permeate so that the permeate could be used for irrigation purposes, in which case such nutrients would be useful. In such a case, the irrigation use would remove or capture the nutrients. The permeate may also be processed using the polishing and disinfection processes to produce reuseable, purified water (e.g., potable water).

In some embodiments, the concentrate streams in the concentrate feed tank 27 are not treated by the AnMBR system 56. Although not shown in FIG. 1, the concentrate streams in concentrate feed tank 27 can be treated with an anaerobic bioreactor (without a second filtration unit 68), an aerobic bioreactor, thermolytic processes (e.g., thermal hydrolysis and supercritical oxidation), or dewatering processes (e.g., centrifuge, belt press, screw press, drying bed, pelletization), and combinations thereof.

Methods:

In some embodiments, the present disclose provides a method for treating wastewater. The method includes feeding a wastewater stream 12 to a settling tank 22 that separates the wastewater into a concentrate stream and a supernatant stream. The concentrate stream exits the settling tank 22 through a solids outlet 26 disposed near a bottom end of the settling tank, and the supernatant stream exits the settling tank 22 through a supernatant outlet 28 disposed above the solids outlet.

In some embodiments, the method includes feeding the supernatant stream to a membrane feed tank 32 that separates the supernatant into a second concentrate stream and a second supernatant stream. The second concentrate stream exits the membrane feed tank through a solids outlet 34 disposed near a bottom end of the membrane feed tank 32 and the second supernatant stream exits the feed tank through a fluid outlet disposed above the solids outlet.

In some embodiments, the method includes feeding the second supernatant stream to a filtration unit 40 comprising porous filtration media that separates the second supernatant stream into a permeate stream and a retentate stream. The method further includes recycling the retentate stream back to a second fluid inlet 52 in the membrane feed tank 32.

In some embodiments, the method includes feeding the concentrate stream exiting the settling unit 22 or the membrane feed tank 32 to an anaerobic bioreactor 58 having microorganisms that breakdown biodegradable material in the solids to produce a biogas. In some embodiments, the method further includes feeding fluid treated in the anaerobic bioreactor 58 to a second filtration unit 70 comprising porous filtration media that separates the fluid into a permeate stream and a retentate stream, where the retentate stream exiting the second filtration unit is recycled back to the anaerobic bioreactor 58.

In some embodiments, the method includes operating system 10 in a batch mode. During the batch mode operation, one or more process unit in the system 10 may operate for a duration while one or more other process unit in system 10 is offline (e.g., isolated from other process systems by closed values). For example, the wastewater stream 12 may be fed to the settling tank 22, and the wastewater stream 12 may be allowed to settle and mix within the settling tank 22 without the supernatant or concentrate streams exiting the settling tank 22 (e.g., outlet valves on the settling tank 22 are closed). In some embodiments, batch mode operation could include stopping the filtration units 40, 68 for a recovery period, backwashing to clean the filtration media, or for cleaning using a chemical reagent (e.g., acid or base to remove fouling).

In some embodiments, batch mode operation could include feeding the concentrate stream to the AnMBR system 56 and allowing the AnMBR system 56 to operate for a duration without feeding addition concentrate to the system 56.

In some embodiments, the method includes operating the system 10 under continuous operation. Under continuous operation, one or more process unit in the system 10 operates continuously without isolation (e.g., closing both inlet and outlet valves). For example, the settling tank 22 is never full drained of its contents. In some embodiments, under continuous operation, multiple filtration units 40 and 68 are used in series or in parallel to allow cleaning and regeneration of a spent filtration unit. Semi-continuous operation, which comprises a combination of the batch and the continuous modes, can also be used.

In some embodiments, a concentration factor (CF) is defined as the volumetric flow rate of wastewater fed to the settling tank 22 divided by the total volumetric flow rate of both the first concentrate stream exiting the settling tank 22 and the second concentrate stream exiting the membrane feed tank 32. Hence, at a CF of 2, the sum of the concentrate streams has a 2× decrease in volume and roughly 2×increase in solids content, compared to the influent wastewater fluid stream 12. In some embodiments, the method includes operating the system 10 at a CF of at least 2. In some embodiments, the method includes operating the system 10 at a CF from 2 to 100. In some embodiments, the method includes operating the system 10 at a CF of at least 2, at least 5, at least 10, at least 15, to less than 20, to less than 30, to less than 40, to less than 50, or to less than 100.

In some embodiments, the method includes feeding a flocculent, a coagulant, a polyelectrolyte or a combination thereof to the settling tank 22 or the membrane filtration tank 32. In some embodiments, the method includes feeding a scouring agent to the settling tank or the membrane filtration tank.

In some embodiments, the provided systems and methods exhibit an improved, stable operation relative to systems and methods operating without a membrane feed tank 32 (e.g., FIGS. 8A-B)). In some embodiments, the transmembrane pressure (TMP) of the filtration media in the first filtration unit 40 may be less than 0.6 bars after at least 30 hours of operation, or less than 0.5 bars, or less than 0.4 bars, or less than 0.3 bars, or less than 0.2 bars, or less than 0.1 bars after at least 30 hours of operation (or after at least 40 hours of operation, or 50 hours of operation, or 60 hours of operation, or 70 hours of operation, to less than 80 hours of operation, or less than 90 hours of operation, or less than 100 hours of operation, or less than 110 hours of operation, or less than 120 hours of operation). In some embodiments, the TMP of the filtration media remains between 0.6 bars to 0.1 bars, or between 0.5 bars to 0.1 bars, or between 0.4 bars to 0.1 bars, or between 0.3 bars to 0.1 bars after the above mentioned hours of operation. In some embodiments, the aforementioned TMPs are achieved using the provided systems and methods with a feed flow rate from 0.5 L/min to 10 L/min with a synthetic wastewater fluid (e.g., Complex Organic Particulate Artificial Sewage (COPAS) at a concentration from 200 to 1000 mg/L). The COPAS feed may be composed of (i) 40% proteins, 43% carbohydrates, and 17% fats, (ii) have elemental constituents of 48.1% C, 6.35% N and 1.57% P of the organic fraction, (iii) have a tCOD/wt and COD/TOC of 1.5 and 2.6, respectively, or (iv) combinations thereof.

EXAMPLES

The following examples are presented by way of illustration and are not meant to be limiting in any way.

A variety of different testing tools, methods, and procedures have been used to assess the water quality parameters, reactor conditions, and membrane performances. The examples section will highlight the overall tests and procedures that have been conducted to exemplify embodiments of the present disclosure.

Test Methods and Definitions

Water Quality Parameters:

For determining reactor performance and observing changes, several analyses were conducted on liquid samples. These tests include: ammonia ($NH_3$—N), total chemical oxygen demand (tCOD), soluble chemical oxygen demand (sCOD), total nitrogen (TN), total phosphorous (TP), total solids (TS), volatile solids (VS), total suspended solids (TSS), volatile suspended solids (VSS), total organic carbon (TOC), individual volatile fatty acids (iVFAs), biogas composition, pH, temperature, and turbidity. Reactor samples were analyzed once every week. Polypropylene bottles were used for sample collection. Unless otherwise stated, most of the samples were analyzed on the same day of sample collection and they were later stored in a refrigerator at 4° C.

Ammonia Nitrogen ($NH_3$—N):

Ammonia-nitrogen content was determined with both colorimetric and ion selective electrode (ISE) probe methods. For colorimetric method, the Hach High Range Test'N'Tube™ Method 10031 (0.4-50 mg $NH_3$—N/L), also called the salicylate method, was used (Hach, Loveland, Colo., USA). This method only allows for soluble sample measurement. Suspended samples were centrifuged at 3,000 RPM for 20 min. Then the supernatant was used for soluble samples. For each testing, one blank vial using deionized water (DI) was prepared along with the samples. This method requires a 0.1 mL of sample volume and two different prepared powder addition into each sample. First, the contents of one of the ammonia salicylate powder pillows (sodium salicylate and sodium nitroferricyanide) was added into the sample vial. Then, the content of one of the ammonia cyanurate powder pillows (sodium dichloroisocyanurate, lithium hydroxide, sodium citrate and sodium tartrate) was added. Vials were mixed until all powder content dissolve and left for reaction for at least 20 minutes. Depending on the ammonia concentration in the samples, a color change with different intensity was observed. After the reaction period, vials were wiped clean and the concentration was measured as mg $NH_3$—N/L using a spectrophotometer (Hach DR/4000, Loveland, Colo., US).

An Orion 95-12 model ammonia probe (Thermo-Scientific, Waltham, Mass.) was used for the ion selective electrode (ISE) probe method, which was adapted from Standard Method 4500D. A series of standard solutions covering the concentrations of 100, 10, and 1 mg $NH_3$—N/L were prepared for calibration. Ammonia probe was connected to a pH meter (Corning pH/ion analyzer 350) with a BNC connector. A 25-mL volume for each sample and standard solutions were then transferred in 30-mL beakers. Prior to reading, 1 mL ionic strength and pH adjusting solution (Thermo Scientific EW-05730-51, Waltham, Mass.) was added into the beakers. A magnetic stirrer and magnetic stir bar were used to mix the samples at 100 RPM (Thermo Scientific 88880008, Waltham, Mass.). Ammonia probe was then inserted and left for equilibrium around 2-3 minutes. The readings were taken as milli volts (mVs) and sample $NH_3$—N concentrations were determined using a calibration curve.

Chemical Oxygen Demand (COD):

The COD is a rapid measurement technique to estimate the total organic concentration in a given sample. A specified strong oxidant (the dichromate ion) reacts with the organics in the sample and reduced to chromic ion, giving a green color. Then, either the remaining chromic ion or the hexavalent chromium ion can be used to determine the sample's organic concentration. Depending on the sample type, COD can be categorized in two different portions: soluble (sCOD) and total (tCOD). For the present disclosure, sCOD is defined the supernatant of the centrifuged raw samples at 3000 RPM for 20 min. For COD measurement, Hach High Range (20-1500 mg/L COD) USEPA Reactor Digestion Method (Method 8000), adapted from Closed Reflux Colorimetric Standard Method 5220D, was used. A 2 mL sample volume is required for Hach High Range digestion method. A blank with DI water and samples for total and soluble fractions were prepared. Samples with suspended solid content were mixed (Thermo Scientific 88880008, Waltham, Mass.) at 100 RPM during the 2-mL transfer from the sample container to digestion vials. The vials were mixed to dissolve the settled reagent content and placed in a preheated Hach reactor for incubation for 2 hours at 150° C. After the incubation, the vials were taken out, mixed, and allowed to cool to room temperature for 30-45 min. Depending on the COD concentration in the samples, a color change with different intensity was observed. Finally, the vials were wiped clean and the concentration was measured using a spectrophotometer (Hach DR/4000, Loveland, Colo., US).

Total Nitrogen (IN):

Total nitrogen content of the samples was measured using Hach Total Nitrogen High Range (2 to 150 mg/L)

Test'N'Tube™ Method 10072. A 0.5-mL sample volume is required for Hach Total Nitrogen High Range method. First, the contents of one of the nitrogen persulfate powder pillows was added into each hydroxide digestion reagent vial. A blank with DI water and samples for total and soluble fractions were prepared. Soluble samples were prepared by centrifuging raw samples at 3000 RPM for 20 min. Samples with suspended solid content were mixed (Thermo Scientific 88880008, Waltham, Mass.) at 100 RPM during the 0.5-mL volume transfer from the sample container to the vials. The vials were mixed and placed in a preheated Hach reactor for incubation for 30 min at 105° C. After the incubation, the vials were taken out and allowed to cool to room temperature for 30-45 min. Then, first, the content of one of the bisulfate reagent A powder pillows was added into each vial and mixed intensely for 30 seconds. Next, after a 3-minute reaction time, the content of one of the indicator reagent B powder pillows was added into each vial and mixed intensely for 15 seconds. After a 2-minute reaction time, 2-mL of the digested sample solution was transferred into the second acid reagent C solution vial. Capped vials then slowly inverted at least 10 times in order to mix and achieve maximum recovery. Depending on the TN concentration in the samples, a yellow color change with different intensity was observed. Finally, after a 5-minute reaction time, the vials were wiped clean and the concentration was measured using a spectrophotometer (Hach DR/4000, Loveland, Colo., US).

Total Phosphorous (TP):

Total phosphorous content of the samples was measured using Hach Total Phosphorous (phosphate) High Range (1 to 100 mg/L) by the Molybdovanadate Test 'N Tube™ Method 10127. A 5-mL sample volume is required for Hach Total Phosphorous High Range method. First, the contents of one of the potassium persulfate powder pillows was added into each vial. A blank with DI water and samples for total and soluble fractions were prepared. Soluble samples were prepared by centrifuging raw samples at 3000 RPM for 20 min. Samples with suspended solid content were mixed (Thermo Scientific 88880008, Waltham, Mass.) at 100 RPM during the 5-mL volume transfer from the sample container to the vials. The vials were mixed and placed in a preheated Hach reactor for incubation for 30 min at 150° C. After the incubation, the vials were taken out and allowed to cool to room temperature for 30-45 min. Then, first, 2 mL 1.54 N sodium hydroxide standard solution was added into each vial and mixed. Next, 0.5 mL molybdovanadate reagent was added into each vial using polyethylene dropper and mixed. Finally, after a 7-minute reaction time. Depending on the TP concentration in the samples, a yellow color change with different intensity was observed. Finally, after a 7-minute reaction time, the vials were wiped clean and the concentration was measured using a spectrophotometer (Hach DR/4000, Loveland, Colo., US).

Total and Volatile Solids:

Solids concentration of the reactor samples was measured according to Standard Methods 2540B, 2540E. First, the weight of the empty clean porcelain crucibles was recorded. 20 mL of sample was then transferred into each crucible and the weight was again recorded. Samples were mixed (Thermo Scientific 88880008, Waltham, Mass.) at 100 RPM during the transfer from the sample container to the crucibles. Crucibles with samples then placed in an oven (Fisher ISOTEMP®100 Series Model116G) at 105° C. for at least eight hours for drying. At the end of 8-hour drying period, crucibles were taken out of the oven and placed inside a desiccator at least for 20 min for cooling. After 20-min cooling, dried crucibles were weighted again, and readings were recorded. Next, dried crucibles were ignited in a muffle furnace (Thermolyne 48000 Benchtop Muffle Furnaces, Thermo Scientific Waltham, Mass.) for at least 45 min at 550° C. At the end of 45-min igniting period, crucibles were taken out of the muffle furnace and placed inside a desiccator at least for 20 min for cooling. Finally, after 20-min cooling, ignited crucibles were weighted again, and readings were recorded. Total and volatile solids concentrations were calculated according to Eq. 2.1, 2.2, 2.3.

$$\text{mg total solids}/L = \frac{(A-B) \times 1000}{\text{sample volume, mL}} \quad \text{(Eq. 2.1)}$$

where: A=Final weight of dried crucible, mg, B=Weight of empty crucible, mg $$\text{mg volatile solids}/L = \frac{(A-B) \times 1000}{\text{sample volume, mL}} \quad \text{(Eq. 2.2)}$$

where: A=Final weight of dried crucible before ignition, mg, B=Final weight of dried crucible after ignition, mg, $$\text{mg fixed solids}/L = \frac{(A-B) \times 1000}{\text{sample volume, mL}} \quad \text{(Eq. 2.3)}$$

where: A=Final weight of dried crucible after ignition, mg, and B=Weight of empty crucible, mg.

Total Suspended and Volatile Suspended Solids:

Suspended solids concentration of the reactor samples was measured according to Standard Methods 2540D, 2540E using µm pore size Whatman® glass microfiber filters (Grade 934-AH). First, the glass fiber filters were rinsed with DI water and dried in an oven (Fisher ISOTEMP®100 Series Model116G) at 105° C. for at least 30 min. Then, the glass fiber filters were taken out of the oven and placed inside a desiccator at least for 20 min for cooling. The weight of each glass fiber filter was then recorded. Depending on the density of the reactor content, 3-5 mL of reactor sample was then filtered, and solids were collected on the glass fiber filter surface. Samples were mixed (Thermo Scientific 88880008, Waltham, Mass.) at 100 RPM during the transfer from the sample container for filtration. Glass fiber filters then placed in an oven (Fisher ISOTEMP®100 Series Model116G) at 105° C. for at least two hours for drying. At the end of 2-hour drying period, glass fiber filters were taken out of the oven and placed inside a desiccator at least for 20 min for cooling. After 20-min cooling, dried glass fiber filters were weighted again, and readings were recorded. Next, dried glass fiber filters were ignited in a muffle furnace for at least 45 min at 550° C. At the end of 45-min igniting period, glass fiber filters were taken out of the muffle furnace and placed inside a desiccator at least for 20 min for cooling. Finally, after 20-min cooling, ignited crucibles were weighted again, and readings were recorded. Total and volatile solids concentrations were calculated according to Eq. 2.4, 2.5, 2.6.

$$\text{mg total suspended solids}/L = \frac{(A-B) \times 1000}{\text{sample volume, mL}} \quad \text{(Eq. 2.4)}$$

where: A=Final weight of dried glass fiber filter, mg, B=Weight of glass fiber filter before filtering, mg, $$\text{mg volatile suspended solids}/L = \frac{(A-B) \times 1000}{\text{sample volume, mL}} \quad \text{(Eq. 2.5)}$$

where: A=Final weight of dried glass fiber filter before ignition, mg, B=Final weight of dried glass fiber filter after ignition, mg, $$\text{mg fixed suspended solids}/L = \frac{(A-B) \times 1000}{\text{sample volume, mL}} \quad \text{(Eq. 2.6)}$$

where: A=Final weight of dried glass fiber filter after ignition, mg, B=Weight of glass fiber filter before filtering, mg.

Total Organic Carbon:

Total organic carbon content of the samples was measured using TOC-5000 analyzer (Shimadzu, Kyoto, Japan) equipped with non-dispersive infrared detector (NDIR) and ASI-5000 autosampler using zero grade air as carrier gas (AI Z200; Airgas, Stafford, Conn.). TOC is measured by lowering the sample pH to 2 to 3 by automatically adding phosphoric acid and sparging the sample to eliminate the inorganic carbon (IC) component. This is called non-purgeable organic carbon (NPOC, or non-volatile organic carbon). If present, volatile organic carbon can escape from the sample during sparing and can be lost, however, this is generally relatively small. After sparging, sample is oxidized and decomposed to form carbon dioxide and finally detected by NDIR. For this research, NPOC method was used for permeate and soluble samples. In the presence of suspended or colloidal solids, samples were first centrifuged at 3000 RPM for 20 min, then the supernatant was filtered with Whatman® glass microfiber filters (Grade GF/C, WHA1822025). First, prepared samples were transferred into 40-mL glass vials with silicone septum (S1360040; Thermo Scientific, Madison, Wis.). A series of standard solutions covering the concentrations of 1-1000 mg TOC/L were prepared for calibration. The concentration range was chosen based on the proximity of the sample's concentrations and at least 5 different solutions were prepared for linear correlation using potassium hydrogen phthalate. TOC-5000 analyzer was also equipped with a total nitrogen (TN) analyzer (TNM-1 Total Nitrogen Measuring Unit). Combusted sample decomposes to nitrogen monoxide, which then is detected by chemiluminescence gas analyzer. TN content of permeate and soluble samples were also analyzed for comparison. A series of standard solutions covering the concentrations of 1-1000 mg TN/L were prepared for calibration. The concentration range was chosen based on the proximity of the sample's concentrations and at least 5 different solutions were prepared for linear correlation using potassium nitrate. TOC-5000 has the capability of measuring both TOC/TN with one injection. Therefore, only one sample was used for both detections.

Gas Chromatography:

The individual volatile fatty acids in liquid samples (iVFAs: acetic, propionic, butyric, isobutyric, valeric, isovaleric acids) were monitored using a gas chromatograph (GC) (Agilent 7820A) equipped with a flame ionization detector (FID) and a 30-m J&W DB-FFAP 122-3232 Fused Silica, 0.25 mm diameter GC column (Agilent Technologies, Lexington, Mass.). 4.5 mL/min helium was used as carrier gas. The oven temperature was set to 80° C. for 1 min, 10 C/min to 180 C holding for 2 min at each increase. The total run time was 13 min. Detection time per injection lasted for 12 min. Samples with colloidal solids were filtered with 0.45 µm membrane filter and 35 µm HCl acid was used to acidify the samples. A series of standard solutions covering the concentrations of 0.5-10 mmol iVFA/L were prepared for calibration using pure standard acid solution (>99% purity).

Reactor headspace methane content ($CH_4$) was analyzed using a gas chromatograph (GC) (Agilent 7820A) equipped with a thermal conductivity detector (TCD) and a 30-m J&W 19091P-MS8 HP-PLOT Molesieve 0.32 mm GC column (Agilent Technologies, Lexington, Mass.). The inlet, oven and detector temperature were set at 185° C., 50° C. and 160° C. respectively. Helium was used as carrier gas at 1.3 mL/min. A volume of 100 µl of gas sample was first taken from the reactor's headspace and immediately injected to the instrument using a 500 µl glass gas-tight syringe (National Scientific, Rockwood, Tenn.).

pH:

The pH of all samples was measured using a digital pH meter (Corning pH/ion analyzer 350) immediately after samples were collected. The pH meter is equipped with a glass pH electrode (Oakton Instruments, Vernon Hills, Ill., USA). Before measurement, the pH probe was cleaned with DI water, dried, and calibrated using three different pH buffer solutions with a pH of 4, 7, and 10 (Fisher Scientific, Pittsburgh, Pa.). The measurement was taken by immersing the pH probe into the sample and allowing to stabilize for 1-2 min. After the measurement, the probe was once again cleaned with DI water, dried, and stored in a 4M potassium chloride electrode storing solution.

Turbidity:

The turbidity of all samples was measured using a 2100Q portable turbidimeter (Hach, Loveland, Colo., USA). Before measurement, the turbidity meter was calibrated using four different calibration standards with a turbidity of 10, 20, 100, and 800 NTU (Stablcal®, Hach, Loveland, Colo., USA). For measurement, a 20-mL glass vial was filled with sample and inserted into the turbidimeter. The measurement was repeated three times and the results were averaged.

Flux, Specific Flux, and Trans Membrane Pressure (TMP):

Membrane performance was identified based on two parameters: flux and trans membrane pressure (TMP). For these examples, the membrane was operated at a set flux for both DMF and AnMBR systems. In this configuration, the TMP starts at a lower value and eventually increases over time due to membrane fouling. Flux, Specific Flux, and TMP were calculated with the following equations:

$$J = \frac{Q_p}{A_m} \quad \text{(Eq. 2.7)}$$

where: J=Flux, liters/m²/hour, LMH; $Q_p$=Permeate flow rate, L/h; and $A_m$=Total membrane area, m²;

$$J_{specific} = \frac{J}{TMP} \quad \text{(Eq. 2.8)}$$

where: $J_{specific}$=Specific Flux, liters/m²/hour/bar, LMH/bar; J=Flux, liters/m²/hour, LMH; TMP=Trans membrane pressure, bar;

$$TMP = \frac{P_F + P_C}{2} - P_P \quad \text{(Eq. 2.9)}$$

where: $P_P$=Permeate transducer pressure, bar; $P_F$=Feed transducer pressure, bar; and $P_C$=Concentrate transducer pressure, bar.

Membrane Resistance and Fouling Definitions:

In order to determine the membrane performance and filterability assessments, fouling is calculated and reported. Depending on the cleaning procedure, different fouling terminology is defined. Membrane resistance is often calculated using resistance in a series model as in Eq. 2.10:

$$J = \frac{\Delta P}{\mu R_t} = \frac{\Delta P}{\mu(R_m + R_r + R_{irr})} \quad \text{(Eq. 2.10)}$$

where: J=Flux, liters/m²/hour, LMH; ΔP=TMP, bar; μ=Dynamic viscosity of water, Ns/m²; $R_t$=Total resistance to flow, 1/m; $R_m$=Intrinsic resistance, 1/m; $R_r$=Reversible resistance, 1/m; and $R_{irr}$=Irreversible resistance, 1/m.

In the examples provided herein, at the termination of the long-term DMF-AnMBR integration example (Example 3), DMF membrane module was subjected to physical and chemical cleaning. Reversible and irreversible fouling were represented by the resistances after physical and chemical cleanings, respectively.

Data Acquisition

Temperature Monitor and Reactor Heating:

AnMBR temperature was monitored using thermocouple temperature sensors (S-TMB-M006, Onset, Bourne, Mass.). The sensors were connected to a data acquisition system (ONSET, U30, Bourne, Mass.) and were continuously monitored. Two temperature sensors were placed at the bottom and the top of the reactor and the average of two were reported. Reactor heating was accomplished by a stainless-steel aquarium heater controlled by a proportional integral derivative (PID) heating controller (Barnsted Deluxe Temperature Controller R/S Model 900-1475, Barrington, Ill.). The reactor temperature was kept at mesophilic conditions (e.g., 36±1° C.).

Biogas and Permeate Measurements:

Reactor biogas production was monitored by connecting the reactor's headspace to a wet tip meter (WTM). The biogas filled the WTM causing a mechanical displacement indicating the biogas production. WTM was calibrated such that every 85 mL gas production was counted as one tip. The WTM was connected to a data acquisition system (ONSET, U30, Bourne, Mass.) with a pulse input adapter (S-UCCM006, Onset, Bourne, Mass.).

Permeate production was monitored by a custom-made permeate counter. Similar to WTM, the permeate counter was also equipped with a pulse input adapter (Onset, S-UCCM006, Bourne, Mass.) which was connected to a data acquisition system (ONSET, U30, Bourne, Mass.). The permeate was first collected in a container and then discharged using a level sensor. Each discharge was recorded and accounted for a 50-60 mL permeate volume.

Membrane Pressure Transducers:

All membranes were equipped with three pressure transducers (Cole-Parmer, EW-68075-32, Vernon Hills, Ill.) placed in the membrane feed, concentrate, and permeate sides. Prior to installing, the transducers were calibrated with a gas pressure gauge based on a voltage reading (Cole-Parmer, EW-68950-35, Vernon Hills, Ill.).

Synthetic Waste Water

Due to the limitation of obtaining fresh municipal wastewater, the experiments were conducted using a synthetic wastewater, Complex Organic Particulate Artificial Sewage (COPAS). COPAS is obtained by using a finely ground and sieved (maximum particle diameter 0.472" or 1.7 mm) cat food. It was reported that COPAS granules are mainly composed by 40% proteins, 43% carbohydrates, and 17% fats. Elemental constituents were found in proportions of 48.1% C, 6.35% N and 1.57% P of the organic fraction. COPAS tCOD/wt and COD/TOC resulted in values of 1.5 and 2.6, respectively.

In order to determine COD/wt, COPAS was tested with different solids concentrations. Four different solutions with the concentration of 200, 500, 700, 1000 mg COPAS/L were prepared and mixed at 100 RPM for 24 hours. Samples taken at 1, 2, and 24-hour intervals. Results showed that the COD/wt ratio was 1.16 for this batch cat food. The same batch was used for all testing in the present examples.

In order to confirm the tCOD/wt, COD, TN, TP, and ammonia loadings, a 430 mg/L COPAS solution was tested over a 24-hour period. This period was chosen in order to determine how the soluble and particulate fraction of COPAS change over time. This 24-hour test reveal that the ammonia was not present and COD/wt, TN and TP concentrations were 1.17, 28.6±2.9 mg/L and 13.6±3.6 mg/L, respectively Membrane Filtration Systems Membrane Module Construction:

Pentair polyvinylidene fluoride (PVDF) X-Flow tubular membranes were used for external crossflow membrane module construction. All membrane modules were built similar with a clear PVC pipe for visual observation. Depending on the required membrane area, different numbers of tubular membranes were used. Two different membrane modules for both systems (DMF and AnMBR) were constructed. Each membrane module for the same system had the same membrane area (0.25 m² for DMF, 0.075 m² for AnMBR). The tubular membranes were first held in together with 3D printed spacers and glued with epoxy. The modules were left for drying for 24 hours before use.

AnMBR Reactor Configuration:

Two different reactor designs with similar configurations were used for the AnMBR construction. For the initial AnMBR experiment (Example 1), an upflow sludge blanket reactor (UASB) with an effective volume of 6.2 liters and 1.2 liters headspace was built. For the DMF-AnMBR study (Example 3), another UASB reactor was constructed with an effective volume of 11 liters and headspace of 1 liter. For both cases, the supernatant of the reactor contents was fed continuously to the bottom of the membrane module by a peristaltic pump (Cole Parmer, Vernon Hills, Ill.). For permeate production, backwashing, and feeding, three separate peristaltic pumps were used (Cole Parmer, Vernon Hills, Ill.). For both cases, the reactors were heated by a stainless-steel aquarium heater controlled by a proportional integral derivative (PID) heating controller (Barnsted Deluxe Temperature Controller R/S Model 900-1475, Barrington, Ill.). The heater was inserted at the bottom of the reactor where the influent is fed. The biogas productions were measured by connecting the reactors' headspaces to a wet tip meter DMF Reactor Configuration:

Two different reactor designs and configurations were used for the DMF construction. For the first DMF design (Example 2, batch operations), a 15-gal square rinse tank (SP0015-SQ5, US Plastics, Allen County, Ohio) was used as a concertation tank. In the initial configuration, the concentration tank was filled with wastewater ($V_{feed}$) and concentrated to a desired final volume ($V_{concentrate}$). At the end of the process, the concentrate was removed from the concentration tank. Thus, the DMF system was operated in a batch mode. In order to define this concept, a term, concentration factor (CF), was defined as the initial volume divided by the final volume ($CF=V_{feed}/V_{concentrate}$). During the filtration process, the wastewater was fed continuously from the bottom of the concentration tank to the bottom of the membrane module by a centrifuge pump (Magnus VSG-6000, Sunpole, Naka-ku Hiroshima, Japan). The concentrate was returned to the concentration tank. Two peristaltic pumps were used for permeate production and backwashing (Cole Parmer, Vernon Hills, Ill.).

For the second design (Example 2 and 3), a 90-L custom-made polypropylene concertation tank (CT) was designed and constructed (SW Plastics, Clearwater, Fla.). The CT incorporated a unique concentrically baffled reactor (FIGS. 2-5). The CT includes eight baffles, thus eight zones separated by the baffles. Baffle openings were designed to promote a plug-flow like regime; therefore, each baffle opening was either at the bottom or the top. In addition to the concertation tank, a second tank, called membrane feed tank (MFT), was included using a Nalgene carboy (3422890050, Thermo-Scientific, Waltham, Mass.). In this configuration, the DMF system was operated in a semi batch/continuous mode. Initially, both the DMF concentration tank and MFT was filled with tap water. The wastewater was prepared in a feed tank and was fed slowly to the middle zone over the operating period. The CT and MFT were connected by a clear PVC at the same level which allowed a gravity feeding. The wastewater then fed from the top of the MFT to the bottom of the membrane modules and the concentrate was returned to the MFT. A peristaltic pump (Cole Parmer, Vernon Hills, Ill.) was used to drain the concentrate from the bottom of the CT and the MFT content. Two additional pumps were also used for permeate production and backwashing (Cole Parmer, Vernon Hills, Ill.). The permeate flow rate and the concentrate/MFT flow rate were adjusted to achieve a desired CF.

Clean Water Flux (CWF) Determination:

Clean water flux (CWF) testing refers to the DI or tap water filterability test in order to determine either a baseline condition for a brand-new membrane or after specific cleaning procedure is employed. During a CWF test, water is passed through the membrane at a slower rate by constantly feeding from a reservoir. The concentrate line flow rate is either decreased or completely shut forcing all water to permeate. For this research, the circulation flow rate was 10 L./min and 0.5 L/min for DMF and AnMBR membranes CWF testing, respectively. After a TMP baseline achieved, the filtration continued for 10 more minutes and TMP was logged. The flow rate was manually measured three times during this 10-minute operation. Finally, the average flux was divided by the 10-min average TMP to calculate the CWF. If CWF test is conducted for the assessment of a cleaning, the results were compared to its brand-new values. If the CFWs were not in the acceptable ranges, then the cleaning was repeated.

Membrane Cleaning Procedure:

After a threshold is reached, membrane cleaning was employed. This threshold was 0.5 and 1 bar for the AnMBR and DMF membrane modules, respectively. For cleaning, 500 ppm NaClO (Clorox, Oakland, Calif.) and citric acid solutions (Decon™ 4401, Orlando, Fla.) were prepared using tap water. The membrane filtration was operated normally except that instead of permeating, only backwashing was applied for 30 minutes at 32 LMH. First, NaClO solution was used, then the membrane was characterized for 30 min with tap water at 32 LMH. Next, citric acid solution was applied for 30 minutes at 32 LMH. Finally, the membrane was characterized for 30 min with tap water at 32 LMH, then a CWF was measured to determine the effectiveness of the cleaning procedure.

Chemical cleaning was applied only once for the AnMBR membrane module (Example 1). For the next phases of the research, a new membrane module was constructed, and the threshold was not exceeded. DMF chemical membrane cleaning was employed several times. In order to determine the distribution of filtration resistances, a series of cleaning techniques were employed. First, a CWF test was done after the termination of DMF process (only Example 3). Next, DMF membrane module was physically cleaned with a jet of tap water. Then, another CWF was employed. Next, a chemical cleaning procedure was implemented as described above. Finally, a CWF was measured.

Example 1: Synthetic Municipal Wastewater Treatment with an Anaerobic Membrane Bioreactor (AnMBR)

INTRODUCTION

Membrane bioreactors (MBRs) have received increased attention over the last decade due to their relative advantages over conventional wastewater treatment technologies. MBRs provide superior water quality in smaller footprints while generally producing less sludge. They are also considered to make decentralized wastewater reuse and sewer mining possible by combining biological treatment with micro- or ultra-membrane filtration to generate a high-quality effluent suitable for reuse. However, conventional MBR systems based on aerobic activated sludge are energy intensive (due to aeration) and still remove rather than recover nutrients.

The anaerobic MBRs (AnMBR) convert wastewater organics to energy (biogas) through anaerobic biological processes. AnMBRs have lower energy requirements as no aeration is required and they produce high quality effluents with less sludge than their aerobic counterparts Lab tests have shown that the operational cost of an AnMBR treating municipal wastewater could be ⅓ of the aerobic treatment process. Further, the energy generated from biogas production has the potential to provide an overall energy surplus. In addition, AnMBRs convert particulate and organically-bound nutrients into soluble N and P, its membrane-filtered effluent (with a significant reduction in pathogens and turbidity) is suitable for nutrient recycling and reuse through irrigation applications such as fertigation. This was observed in a 100-day study where 96% of total N and 93% of total P in the influent were liberated to inorganic forms ($NH_4^+$ and $PO_4^{2-}$) and recovered for potential reuse. In another study AnMBR effluent (generated from treating septic tank wastewater) was used for growing tomatoes and cucumbers in a hydroponic system resulted in comparable crops growth to a commercial fertilizer in terms of plant health indicators showing the feasibility of AnMBR effluent for fertigation in hydroponics.

Although the technology is promising, certain elements prohibit the widespread practice of this process such as membrane fouling, dissolved methane recovery, and competitive sulfate-induced growth. Among these, membrane fouling and its control measures remain a primary challenge requiring further investigation. Research show that fouling mitigation for improved membrane performance is the significant energy demanding process for AnMBR technologies. In order to address this issue, a considerable amount of invasive and noninvasive cleaning methods, preventative procedures, and maintenance techniques have been examined. These methods include: membrane scouring techniques using air or gas (headspace biogas from AnMBRs), addition of granular or powdered activated carbon (GAC, PAC), and membrane vibration and rotation strategies; various filtration cycles incorporating relaxation and/or backwashing; chemical cleanings using acids, bases, and oxidants; addition of adsorbents and coagulants such as $FeCl_3$, $Al_2(SO_4)_3$, PAC (polymeric aluminum chloride); pretreatment processes integrated with AnMBRs or hybrid AnMBRs.

The gas- or air-lift concept is that gas (headspace biogas or $N_2$ in AnMBR systems) is introduced at the bottom of a vertically oriented external membrane module in order to provide biomass recirculation and membrane scouring for fouling control. Gas-lift AnMBRs (Gl-AnMBR) have been proposed to have lower energy requirement due to the prevention or minimization of pumping equipment use for biomass circulation. It was also stated that this process would prevent the sludge exposure to the shear stress which could increase floc disintegration. However, the COD removal efficiency does not show any significant deterioration, whereas the specific methanogenic activity (SMA) increases. Gas-lift fouling control also results in rapid TMP increase, therefore it is not adequate as an only fouling control measure. The only difference between and Gl-AnMBR and other AnMBRs with external membranes is the utilization of head space gas or biomass content circulation in the membrane modules. Relaxation and backwashing could be implemented in both conditions. Another issue is the availability of membrane area. Although Gl-AnMBRs can be more energy efficient, the gas circulation could reduce the filtration area by competing with permeate flux which can cause rapid cake layer formation and fouling. This could require more frequent chemical cleanings and eventually lower the life span for the membranes.

The present example attends to these various issues by providing a system and method that (i) establishes a stable flux for a long-term operation with an external cross flow membrane operation utilizing frequent relaxation and backwashing for fouling control; and (ii) achieves increased overall AnMBR performance in low strength municipal wastewater treatment scenarios for COD, TP, and TN removals and permeate quality.

Materials and Methods:

The laboratory-scale AnMBR consists of an upflow anaerobic bioreactor with an effective volume of 6.2 liters and 1.2 liters of headspace and a custom-made external cross-flow ultrafiltration (UF) module using polyvinylidene fluoride (PVDF) membranes with a nominal pore size of 0.3 μm and a membrane area of 0.075 m² total (Pentair X-Flow; Enschede, The Netherlands). For heating, a stainless-steel aquarium heater controlled by a proportional integral derivative (PID) heating controller was inserted at the bottom of the reactor where the influent is fed. The temperature of the reactor was continuously monitored using inline sensors. The module is equipped with three pressure transducers (placed at the feed, concentrate, and permeate connections) (Cole Parmer, Vernon Hills, Ill.) for measuring the transmembrane pressure (TMP) and data acquisition is done using the HOBOware software. For membrane circulation, permeate production, and backwashing, four peristaltic pumps were used (Cole-Parmer; IL, USA).

The reactor was inoculated with an active biomass of 10 g/L volatile suspended solids (VSS) concentration from a local wastewater treatment plant's anaerobic digester after sieving through 1.7 mm maximum particle diameter sieve (Howard F. Curren Advanced Wastewater Treatment Plant; Tampa, Fla.). Biogas, reactor temperature, and permeate were continuously monitored using HOBO data loggers (Onset Computer Corporation; MA, USA). For handling filtration, relaxation, backwashing cycles, and automatic feeding, a custom-made control system was designed. The cycle started with a 30-minute filtration followed by a 60-second relaxation and a 15-second backwashing at every $6^{th}$ cycle (at 0.045 L/min flow rate). The reactor hydraulic retention time (HRT) is chosen as 1 day and operated at mesophilic conditions (35° C.±1). The flux is set to 4.5 LMH (L/m²/h) throughout the experiment. The cross-flow velocity (CFV) was chosen as 0.1 m/s (0.51 L/min). The membrane feed was taken from the upper part of the reactor. The concentrate stream from the membrane module was returned to the bottom of the reactor where the synthetic sewage was fed. The membrane was chemically cleaned only once after the transmembrane pressure (TMP) exceeded 0.5 bar on the $183^{th}$ day of operation. Except sampling, no biomass was wasted.

Complex Organic Particulate Artificial Sewage (COPAS), which is essentially the granulated cat food, was used to mimic real sewage. COPAS is composed of 92% volatile solids and 8% ash. Proteins, carbohydrates, and lipids composition are 40%, 43%, and 17%, while the elemental composition of carbon, nitrogen, and phosphorous were 48.1%, 6.35%, and 1.57%, respectively. The chemical oxygen demand (COD) and total solids (TS) of COPAS used were chosen as 501 mg/L and 430 mg/L in order to mimic the low strength municipal wastewater characteristics (tCOD/wt ratio, y=1.17). The influent had TN and TP concentrations of 28.6±2.9 mg/L and 13.6±3.6 mg/L, respectively.

Monitoring Parameters and Analytical Methods:

The reactor was operated for 7 months. During this period, reactor soluble chemical oxygen demand (sCOD), total chemical oxygen demand (tCOD), solids (TS, VS, TSS, VSS), permeate tCOD, total nitrogen (TN), ammonia ($NH_4^+$—N), phosphorous ($PO_4^{3-}$—P), total organic carbon (TOC) concentrations, turbidity, transmembrane pressure (TMP), biogas production, permeate production, and temperature were monitored. Solids were performed weekly according to Standards Methods. All CODs, TN, $NH_4^+$—N, TP, were measured weekly using Hach HR digestion vials and Hach Testin Tube™ vials (Hach company, CO, USA). Reactor content was centrifuged at 3000 RPM for 15 minutes and the supernatant was used to measure the sCOD. Biogas production was corrected for standard temperature and pressure conditions (i.e. 0° C. and 1 atm). TOC and TN were measured using a Total Organic Carbon analyzer (Shimadz TOC-V) coupled with a Total Nitrogen detector (Shimadzu TNM-1).

Results and Discussion:

A consistent membrane flux at approximately 4.5 LMH was achieved with the corresponding HRT of 1 day during the entire operating period. The TMP was stable at 0.15 bar for the first 60 days of operation. For this first 60 days, the flux stabilized at 5 LMH. This was presumably due to the slow membrane coating washout and compaction of the membrane matrix. New membranes are coated with certain chemicals as a protective layer to prevent drying and biological growth. Even though the new membranes are first cleaned with either tap or deionized water, the coating chemical washout is a slowly degrading process. It was observed that with new-constructed membranes, this washout process and the slow relaxation of compact membranes create a temporary low resistance in the TMP, hence increases the overall flux.

For the remaining operating period, flux stabilized at the set value of 4.5 LMH since the reactor condition was kept the same. After 60 days, however, the TMP started to gradually increase and reached to 0.5 bar on the $183^{rd}$ day of operation. Compared to a gas-lift AnMBR study with psychrophilic temperature shocks and periodic backwashing for 209 days, the membrane was able to maintain the TMP for 183 days without requiring a chemical cleaning while the membrane in the gas-lift study had to be cleaned three times (on days 19, 42, and 89). Also, despite the chemical cleanings, the TMP stabilized at 0.45 bar while the TMP was around 0.25 bar throughout the present Example 1 (see, Table 3.1). Similarly, in both studies, the TMP seems to be completely independent from the flux. In another study, a gas-lift AnMBR system operated for 100 days at a CFV of 0.5 m/s with a continuous head space gas flow (E value of 0.1) to the membrane as an only non-invasive fouling control. Additional weekly cleaning of relaxation (15 min), forward flushing with tap water (CFV of 1 m/s for 15 min), backwashing with tap water (2 L/h for 15 min), forward flushing with NaClO (500 ppm for 15 min) followed by tap water rinsing were applied and an average flux of 10 LMH was established for the operating period. Even though the membrane was maintained weekly, the flux decline was observed throughout the experiment. This shows that even though a functional reactor operation could be achieved with a gas-lift setup, labor intensive frequent membrane maintenance is required to achieve higher membrane performance. The frequent chemical cleaning could also be problematic in terms of membrane integrity. It is known that membrane cleaning with NaOH and NaClO in PVDF membranes impacts the membrane stability causing a reduction in mechanical properties and chemical composition thus believed to negatively affect its hydrophilicity. A lower protein retention may also be observed. The present example shows that frequent relaxation and backwashing is promising in order to maintain and achieve successful membrane performances.

The AnMBR system showed stable performance in terms of COD achieving 85±8.9% removal efficiency for the entire operating period. The average permeate COD concentration was around 80 mg/L. The permeate quality of the system tested is comparable to the previous GI-AnMBR studies (e.g., Dolejs et al (2017) Effect of psychrophilic temperature shocks on a gas-lift anaerobic membrane bioreactor (Gl-AnMBR) treating synthetic domestic wastewater. *Journal of Water Process Engineering*; and Prieto et al., (2013) Development and start up of a gas-lift anaerobic membrane bioreactor (Gl-AnMBR) for conversion of sewage to energy, water and nutrients. *Journal of Membrane Science*, 441, 158-167). They reported that their CODt concentrations were 55±18 mg/L and 75±34 mg/L for the final permeate during the entire operating period. One reason for the consistent permeate COD concentrations in AnMBRs is the membrane which retains all suspended solids and only allows the soluble fractions of organics and minerals to leave. The turbidity in the permeate was consistently lower than 1 NTU after the start-up period (0-30 days) while a slightly higher turbidity of 6.9±2.3 NTU was reported in the Gl-AnMBR study (Prieto et al., 2013).

Total nitrogen (TN), ammonia ($NH_3^+$), and total phosphorus (TP) concentrations were stable and 21.3±6.7, 18.4±0.4, and 6±0.4 mg/L, respectively (Table 1). Even though no ammonia was present in the influent, the mineralization of proteins in the anaerobic digestion process resulted in the presence of ammonia in the permeate. Since the removal of ammonia is established via either nitrification process (requires oxygen) or Anammox process (with the help of a novel bacteria capable of oxidizing ammonia under anaerobic conditions), anaerobic digestion is unable to remove ammonia. The formation of struvite could also reduce the ammonia concentrations in the permeate since it is a component in this process. In AnMBRs, it is contemplated that this formation could be responsible for the internal membrane fouling. The TN removal efficiency was 25.6%. However, the majority of TN in the permeate was ammonia (>95%). This means that only a small portion of nitrogen was used for cell growth or participated in struvite precipitation and remaining was converted to ammonia. This ammonia could be readily used for resource recovery such as in the fertigation process since the permeate is free from solids and pathogens. TP removal was slightly higher than the TN achieving a 56% removal. This was quite similar for the GI-AnMBR study which achieved an average of 55% removal efficiency for the entire operation.

TABLE 1

Summary of average performance data of the AnMBR

| Reactor Conditions | | n |
|---|---|---|
| Temperature, C. | 34.6 ± 1 | — |
| Trans membrane pressure (TMP), bar | 0.25 ± 0.11 | 4872 |
| Daily permeate production, mL | 7647 ± 1238 | 200 |
| Biogas production, L/day | 0.69 ± 0.37 | 200 |
| Flux, LMH | 4.3 ± 0.7 | — |
| Specific flux, LMH/bar | 20.9 ± 10.7 | — |
| pH | 6.72 ± 0.3 | 75 |
| Total solids, mg/L | 9742 ± 3876 | 27 |
| Volatile solids, mg/L | 6253 ± 2707 | 27 |
| Total suspended solids, mg/L | 8284 ± 2479 | 27 |
| Total volatile solids, mg/L | 6165 ± 2385 | 27 |
| Total chemical oxygen demand removal efficiency, % | 85.8 ± 8.9 | 27 |
| Permeate Quality | | |
| Total chemical oxygen demand, mg/L | 71 ± 9.1 | 27 |
| Total organic carbon, mg/L | 18.7 ± 18.4 | 27 |
| Ammonia, mg/L | 18.4 ± 0.4 | 27 |
| Total phosphorous, mg/L | 6 ± 0.4 | 27 |
| Total nitrogen, mg/L | 21.3 ± 6.7 | 27 |
| Turbidity, NTU | 0.7 ± 0.1 | 27 |

Biological phosphorous removal could be achieved either by cell growth (0.015 g P/g VSS, which corresponds to 10-20% removal), or phosphate accumulation stored as poly-β-hydroxybutyrate (PHB) or poly-β-hydroxyvalerate (PHV) by phosphorous accumulating bacteria in anaerobic/anoxic conditions. As in ammonia, phosphorous is also a component for the struvite and could be precipitated in this process.

Reactor TSS and VSS concentrations initially decreased to 5 and 4.5 g/L, respectively, however, after the start-up period, TSS concentration increased to around 10 g/L while VSS concentration stayed around 5 g/L until the $160^{th}$ day of operation. The initial decrease was presumably due to the settling of the solids in the reactor. Even though the effluent was recirculated back into the inlet of the reactor at 0.5 L/min, the sludge blanket formed near the bottom of the reactor resulting in lower TS concentrations at the top of the reactor where the sample was collected. It was observed that any disruption to this zone could raise the settled sludge resulting in temporary fluctuations in solids concentrations.

The average biogas production rate was around 0.69 L/day or 115 L/$m^3$/d sludge after the start-up (0.111 L·g/VSS or 0.175 L CH4·g/COD$_{removed}$, assuming 70% methane in the biogas). The lower biogas production on the $70^{th}$ and $130^{th}$ days of operation were due to the biogas leaking after sensor maintenance has been conducted in the reactor. The disturbance that has occurred in the sludge blanket section resulted the sludge raise to the sampling region rather than an immediate increase in the solids concentrations as a result of growth. This has been observed in the reactor for each time a level sensor maintenance was conducted. Compared to the Gl-AnMBR studies, biogas production rate was slightly lower. Prieto et al reported an average of 450 L/$m^3$ sludge per day biogas production. One reason for the lower biogas production in our study could be that our reactor was operated at an HRT of 1 day and 500 mgCOD/L influent whereas Gl-AnMBR was conducted at an HRT of 3 days and 1250 mgCOD/L influent. The higher HRTs could potentially increase the hydrolysis rate which enables higher methanogenic activity. COD mass balance showed that 50% was retained in the reactor while 36% was transferred the methane and 14% left in the permeate.

The average effluent quality of this system is comparable to ISO 30500 non-sewered sanitation systems and EPA potable reuse guidelines. The COD threshold for discharge into surface water or other restricted urban uses requirement for the ISO 30500 is 150 mg/L, which is well above the average AnMBR effluent COD concentration. It also requires a 70% and 80% removal for total nitrogen and total phosphorus. While the effluent quality of the AnMBR is below this required thresholds, it could be coupled with additional processes to further enhance the quality in order to recover the TN and TP.

The present example shows that frequent relaxation and backwashing enables prolonged membrane operation at lower flux without requiring an invasive cleaning (183 days at 5 LMH). Compared to Gl-AnMBR, where the head space gas is used for membrane scrubbing, efficient membrane operation is achieved at lower TMP for more extended period. It was also shown that AnMBR technology is capable of treating low strength wastewater achieving a desirable removal efficiency in terms of biological degradation and throughput (>85% COD removal at 1-day HRT) and higher quality effluent (<1 NTU) which is suitable for resource and energy recovery.

Example 2: Batch and Continuous Direct Membrane Filtration (DMF) Operation

INTRODUCTION

In recent decades, impacts of climate change, urbanization, and population growth have led to a broad spectrum of problems on world food supply, marine ecosystem, and water resources. Water scarcity, being the common denominator among all these, is affecting more people than ever. A quarter of the world's population has already been affected by water scarcity. The future projections also emphasize that the climate related issues will dominate all of the top five long terms risks exacerbating the existing pressures.

In the light of all the problems, shortages, and scarcities, our perspective on wastewater treatment for a sustainable future need to change. Currently, 3% of global electricity consumption is originated from municipal wastewater which will undoubtedly increase in the future. One of the most significant contributors to this high energy demand is the activated sludge process. Although achieving stable performance and discharge limits, the energy requirement for activated sludge process is around 40-60% of the total energy demand for a wastewater treatment plant. Aging infrastructure is another problem that could potentially increase the overall cost of water and wastewater treatment.

In recent years, wastewater reuse, recovery, and reclamation has received increased attention. Sewer mining is one example that utilize decentralized reclamation concept, where resource recovery is prioritized. In this approach, the wastewater is extracted, treated, and used allowing for on-site usage especially for potable and non-potable purposes, irrigation, and indirect potable reuse. If utilized, this concept can alleviate the pressure from urbanization, population growth, and lighten the burden on aging water and wastewater infrastructures. Due to their compact and stable process designs and easy automation, membrane processes are perfect fit for sewer mining. In fact, the MBR technology is considered in making the decentralized wastewater reuse and sewer mining possible by generating a suitable high-quality effluent. Their applications also include: drinking water purification, municipal and industrial wastewater treatment applications, brackish water and seawater desalination, ultrapure water for industries, boiler feed for power stations, process water for food industry and wastewater reclamation and reuse.

The introduction of waste to energy systems, sustainable developments, resource and nutrient recovery, and decentralized wastewater treatment increased the widespread use of membrane processes, especially the direct membrane filtration (DMF) of municipal wastewater (MVVW). DMF of MVVW could produce a superior treated water quality, increased up-concentration of organics, and enable efficient resource recovery. In this concept, raw municipal wastewater is directly filtered and separated into a concentrated high strength stream and a filtered stream with only dissolved solids, organics, and nutrients. The concentrated part then can be further degraded for energy recovery in anaerobic digestion process eliminating the diluted less efficient organics loadings. The permeate then can be used for various applications for non-potable use and resource recovery.

Even though the DMF of MVVW is promising, membrane fouling is still the main obstacle. In order to identify and prevent fouling, DMF of raw sewage and primary effluent were extensively studied using different types and configurations of membranes, cleaning procedures, pretreatment and backwashing techniques. Backwashing and relaxation also help to mitigate reversible fouling and were proven to be an effective way. Irreversible fouling is generally referred as the fouling that cannot be removed through physical and mechanical methods and requires chemical cleaning. Various procedures and different chemicals were tested in the present example for the removal of irreversible fouling. One of the most effective ways is the application of an oxidant and acid. NaClO and citric acid applications for inorganic and organic fouling removal for both enhanced backwashing and intensive cleaning were found to be quite effective.

The DMF of raw MVVW is promising, however, has not reached maturity and needs further assessment especially for continuous operation. Therefore, the DMF needs to be economically and technologically feasible. While the use of aeration, chemical cleaning, and coagulant additions are effective, their usage ideally would be minimized, if not completely abandoned to improve process economics. This can become challenging for increased durations especially at higher operating fluxes. In this study, we further investigate and compare the DMF filtration of MVVW with two different configurations: batch and semi batch/continuous.

Materials and Methods:

Two laboratory-scale DMF filtration systems for batch and continuous operations were built separately. For the first batch configuration, a 15-gal square rinse tank (SP0015-SQ5, US Plastics, Allen County, Ohio) was used as a concertation tank. For membrane filtration, 5.2 mm diameter polyvinylidene fluoride (PVDF) X-Flow ultrafiltration (UF) tubular membranes (Pentair, Minneapolis, Minn.) were used in external cross-flow configurations for both batch and continuous designs. The membrane had a nominal pore size of 0.03 μm and 0.25 m² effective area. The system consisted of four pumps: one centrifuge pump for wastewater circulation (Magnus VSG-6000, Sunpole, Naka-ku Hiroshima, Japan), three peristaltic pumps for feeding, permeation, and backwashing (Cole Parmer, Vernon Hills, Ill.). The membrane was also equipped with three pressure transducers for determining the trans membrane pressure (TMP) (Cole-Parmer, EW-68075-32, Vernon Hills, Ill.). The transducers were placed at the feed ($P_F$), concentrate ($P_C$), and permeate ($P_P$) sides of the membrane module. Pressure was constantly recorded (1 second sampling 1 min logging intervals) using HOBOware software (ONSET, U30, Bourne, Mass.). Transducers registered a voltage reading depending on the pressure. These voltage readings were later used to calculate the TMP (TMP=(($P_F$+$P_C$)/2−$P_P$)).

For the batch configurations, two different influents were tested. First, a primary settling unit content from a local WW treatment plant (City of Largo WW Treatment Plant, Tampa, Fla.) was collected in carboy storage tanks (3422890050, Thermo-Scientific, Waltham, Mass.). Prior to collection, the wastewater was mixed achieving a homogenous liquid fraction from the primary settling unit. Using the collected primary sewage (PS), DMF was tested until a volume CF is defined as the initial volume divided by the final volume (CF=$V_{feed}$/$V_{concentrate}$). This process continued until the TMP reached to 1 bar which took for four batch operations. After the completion, the membrane was physically and chemically cleaned. The detailed cleaning procedure was explained above.

Next, the settled fresh WW was tested in DMF in order to have a better understanding for the membrane fouling. The wastewater was settled for 30 min and nearly 70% of supernatant was discarded. For this increased solid run, the TMP reached to 1 bar within one batch operation and the process was ended. After the completion, the membrane was physically and chemically cleaned.

Finally, the synthetic wastewater using COPAS was used. This is because accessing to large volumes of fresh real WW was difficult and COPAS was decided to be used for the future testing. Also, a comparison was made to determine if the synthetic and actual WW behave similar. Influent characteristics were given in Table 2. The process was terminated after the TMP reached to 0.9 bar. For the second semi batch/continuous configuration, a 24-gal (90 liters) concentrically baffled concentration tank (CT) was designed and constructed out of polypropylene (SW Plastics, Clearwater, Fla.). A concentrically baffler reactor (CBR) design was chosen due to its plug-flow-like configurations and its efficiency achieving improved solids settling. This design was further improved by a secondary bottom for allowing better solids separation. Also, in order to prevent any back flow and solids rising, hanger baffles were included.

For better membrane performance, other than the concentration tank, a membrane feed tank (MFT) was added using a 5-gal carboy container (3422890050, Thermo-Scientific, Waltham, Mass.). For membrane filtration, another membrane module was built with the same configuration and same membrane area (0.03 μm and 0.25 m²). The system consisted of five pumps: one centrifuge pump for wastewater circulation (Magnus VSG-6000, Sunpole, Naka-ku Hiroshima, Japan), four peristaltic pumps for feeding, permeation, backwashing, and concentrate removal (Cole Parmer, Vernon Hills, Ill.). The previously used transducers for the batch operation was adopted for determining TMP.

Initially, the process was going to be continued until the TMP reached to 1 bar, however, it had to be terminated after 24 separate batches. The final TMP was around 0.13 bar before the termination. For both configurations, cross flow velocity (CFV) was 1.43 m/s.

TABLE 2

Feed characteristics for synthetic COPAS WW, Largo fresh WW, and settled Largo fresh WW

| | COPAS | | Largo WW | | Settled Largo WW | |
|---|---|---|---|---|---|---|
| Parameters | Concentration, mg/L | STDEV | Concentration, mg/L | STDEV | Concentration, mg/L | STDEV |
| TS | 417.7 | 15.3 | 705.9 | 94.6 | 2067.1 | 10.8 |
| VS | 307.3 | 10.2 | 277.7 | 57.2 | 1363.8 | 44.6 |
| TSS | 198.4 | 12.5 | 165.0 | 25.7 | 1101.7 | 14.1 |
| VSS | 168.1 | 9.7 | 141.3 | 20.4 | 961.7 | 7.1 |
| tCOD | 500.0 | 43.0 | 329.4 | 18.9 | 1797.8 | 38.5 |
| sCOD | 83.0 | 4.0 | 76.1 | 9.4 | 529.2 | 14.7 |
| tTP | 30.7 | 0.9 | 10.3 | 0.6 | 49.5 | 3.1 |
| sTP | 7.4 | 0.8 | 2.0 | 0.5 | 11.8 | 0.3 |
| tTN | 14.0 | 1.5 | 10.9 | 2.8 | 52.9 | 4.8 |
| sTN | 3.0 | 0.4 | 4.2 | 1.0 | 25.7 | 1.0 |
| $NH_3$ | ND[1] | NA[2] | 4.2 | 0.1 | 25.6 | 0.1 |

[1]ND: not detected;
[2]NA: not applicable

Monitoring Parameters and Analytical Methods:

The total duration for the batch experiments lasted for 35, 9, and 28 hours for the fresh WW, settled fresh WW, and COPAS feedwaters, respectively. Permeate and concentrate samples were analyzed for total solids (TS), volatile solids (VS), total suspended solids (TSS), volatile suspended solids (VSS), total chemical oxygen demand (tCOD), soluble chemical oxygen demand (sCOD), total nitrogen (TN), ammonia ($NH_3$—N), phosphorous ($PO_4$—P), total organic carbon (TOC), and turbidity. All CODs, TN, $NH_3$—N, TP, were measured weekly using Hach HR digestion vials and Hach Testin Tube™ vials (Hach company, CO, USA). Reactor content was centrifuged at 3000 RPM for 20 minutes and the supernatant was used to measure the soluble fraction. TOC was measured using a Total Organic Carbon analyzer (Shimadzu, Kyoto, Japan) equipped with non-dispersive infrared detector (NDIR) and ASI-5000 autosampler using zero grade air as carrier gas (AI Z200; Airgas, Stafford, Conn.). For some samples, TN were measured with the TOC analyzer coupled with a Total Nitrogen detector (Shimadzu TNM-1).

The semi batch/continues operation lasted 117 hours, each batch run lasting for around 5 hours. At the end of each semi batch cycle, permeate, CT, and MFT samples were collected and analyzed for only tCOD.

Membrane Cleaning Procedure:

After the membrane TMP reached to 1 bar, membrane cleaning was conducted. First, the membrane was taken offline and physically cleaned with a jet of tap water. Next, 500 ppm NaClO solution was prepared in tap water. The membrane was operated with only the circulation and backwashing (BW) pumps were on for 30 min. BW was applied at 32 LMH. Next, the membrane was characterized with tap water for 30 min at 32 LMH. After the characterization, the same procedure was repeated with 500 ppm citric acid (Decon™ 4401, Orlando, Fla.). Finally, the membrane was characterized with tap water and tested for clean water flux (CWF) to determine the effectiveness of the cleaning procedure.

Operation and Membrane Cycles:

In the initial configuration, the concentration tank was filled with wastewater ($V_{feed}$) and concentrated to a desired final volume ($V_{concentrate}$). At the end of the process, the concentrate was removed from the concentration tank. Thus, the DMF system was operated in a batch mode. After decanting the concentrate content, it was observed that a substantial amount of solids were deposited on the CT surface. In order to recover this solids, 0.25-0.5 L tap water was slowly poured on the solids and the collected liquid was incorporated into the concentrate. Not all solids were collected since most were already dried and adhered onto the surface. This was repeated for all batch operations.

Frequent filtration, relaxation (RX), and backwashing (BW) were used for non-invasive membrane cleaning. A preliminary test was conducted to determine the optimum frequency of BW and RX. Without wishing to be bound to any particular theory, it was found that BW at more frequent long durations were more effective, however, in order to minimize permeate lost, a more frequent short duration operation was chosen. This was 90 sec filtration, 15 sec relaxation, and 20 sec BW every 15 min at 32 LMH. RX and BW corresponded to a 15.2% off time during the operation (140 sec off every 920 sec). Due to this off time, effective flux was 15.2% lower than the instantaneous flux.

Results and Discussion:

Batch Mode Membrane Performance and Flux Decline:

Both fresh and synthetic WW showed severe fouling and clogging during the batch operations. The initial instantaneous flux of 77 LMH showed a rapid decrease in the fresh WW operation to below 50 LMH in 5 hours. This was due to the rapid cake layer formation in the membrane module which is expected at higher fluxes. This can also be seen in the TMP increase. The TMP reached to 0.7 bar within 5 hours. After the 5-hour operation, the flux decline showed a slower decline. The average flux for the next 15 hours was 35.6 LMH. The TMP also stabilized around 0.8 bar during this duration. At the beginning of each CF10 operation, a small flux recovery was observed for both wastewaters. The operations were conducted every day or every other day for both operations (except the $2^{nd}$ CF10 operation of COPAS which was operated after one week of the $1^{st}$ CF10 operation). Therefore, between each CF10 operation, there was 18-40 hours of waiting period. This most likely caused some decompression for the cake layer and some solids detached at the beginning of the next cycle which then caused a temporary flux recovery.

For the COPAS operations, the initial flux decline was not as severe as the fresh WW operations. The flux was set at 80 LMH and an average flux of 75 LMH was observed in the first 10 hours. It should be noted that the COPAS CF10 operations were started after one CF2 and one CF5 operations were conducted. The membrane was not cleaned after these two runs, thus the initial TMP at the beginning of the first COPAS CF10 operation was around 0.2 bar whereas the fresh WW operation initial TMP was 0.1 bar. The duration was about 5 hours total for these can be concluded that it took five CF10 runs to reach the 1 bar TMP.

The TMP showed a better initial performance achieving a slightly lower increase compared to fresh WW run. The 0.7 bar was increase was observed after 12 hours. The rapid flux decline started after 10 hours and continued until the process terminated. Even though the flux began to decrease, the rate was not as severe as the fresh WW run. Temporary flux recoveries were also observed similar to fresh WW operation. Even though the initial flux decline and TMP increase was lower, neither the flux nor the TMP stabilized during the COPAS run. The COPAS compared to fresh WW was observed to have a slightly higher adhesive structure that was difficult to remove after the process was terminated. The accumulated solids in the membranes were easily cleaned with a jet of tap water after the fresh WW operation while some scrubbing with a soft sponge was necessary for COPAS operation. This mostly likely prevented the complete cake layer decompression during the filtration process therefore flux and TMP never stabilized.

It can be concluded that both synthetic and fresh wastewaters (WWs) showed similar fouling behaviors when under batch mode operations. Both WWs approximately fouled the membrane in 4 or 5 batch cycles which corresponds to 32 and 34 hours for synthetic and fresh WWs, respectively. It should be noted however, even though COPAS synthetic wastewater achieved a slightly better flux performance, the TMP and flux never stabilized and continued to get deteriorated. Fresh WW operation TMP stabilized near the end of the operation and could be potentially continued further with reduced flux decrease. The final fluxes before the termination of the process were 20 and 10 LMH for fresh WW and synthetic WW, respectively. Average flow rates for the entire operations were 11.4 and 6.5 L/h for synthetic and fresh WWs, processing a total of 287 (including one CF2 and CF5 COPAS operations) and 225 L permeate, respectively (Table 2).

Semi Batch/Continuous Mode Membrane Performance and Flux Improvement

The operation of batch DMF system showed that maintaining a higher flux and lower TMP while the solids concentration is increasing causes severe fouling even though physical and chemical cleaning could remove this fouling. Frequent cleaning can add to the overall cost and complexity and shorten membrane lifespan. To avoid this, a better concentrating tank design with baffles for achieving improved solids settling was incorporated. In the batch mode design, the solids were being fed continuously into the membranes, thus increasing the fouling potential and rapid cake layer formation. If they could be given a chance to settle and removed from the system at the same time, this would drastically decrease the fouling rate since it was shown that the overall fouling was directly proportional to the solids concentration. Baffles have been used for different purposes in wastewater treatment and chemical engineering including achieving a plug flow reactor design by reducing short-circuiting and increasing hydraulic performance, enhancing settling efficiencies in settling tanks, and improving biological reactor performance. Thus, incorporating a baffle tank design will reduce the amount of solids introduced to the membranes and potential fouling when wastewater is being directly filtered. All testing in this and future configurations were done using COPAS synthetic WW.

Semi Batch/Continuous Mode Membrane Performance and Flux Improvement:

Initially, the CBR CT did not include an MFT. The solids were removed from the bottom of the CT at 10% of the initial set flux (7 LMH for the initial testing). The membrane feed flow was taken from the top of the reactor and the concentrate flow returned to the top of the CT. This initial testing showed only slight improvement in terms of flux decline and TMP increase compared to the batch mode operation when five semi continuous batch operations were conducted. The TMP showed no increase within the first 10 hours. Later, the increase was slower and eventually it started to stabilize around 0.85 bar. Flux decline was also slightly slower achieving a final instantaneous flux of 25 LMH compared to 10 LMH for the batch operation.

These results suggested that the efficient solids settling was not achieved and cake layer formation became dominant similar to batch operations. This was due to the increased membrane return flow rate causing turbulence in the CBR CT. External cross flow configurations are operated at higher CFVs to prevent membrane fouling. Submerged configurations use aeration to achieve similar scouring effects for membrane fouling control. However, as shown in Example 1, aeration is less efficient for cross flow configurations. For this research, a high CFV was chosen (34.6 L/min flow rate or 1.43 m/s) since it is more effective for fouling mitigation. To prevent this issue, a secondary tank (MFT) to minimize the solids turbulence was incorporated using a 5-gallon Nalgene carboy. The CBR and MFT were connected on the same level to promote liquid transfer by gravity The membrane return line was connected to the MFT and the system was tested for membrane performance.

DMF of synthetic WW with a CBR and MFT design achieved a higher improvement compared to both batch and only CBR operations. The TMP did not show an exponential increase and eventually stabilized around 0.7 bar. Similarly, flux decline was slower and stabilized approximately 30 LMH. It should be noted that, the CBR content was not removed between the initial CBR and CBR with MFT operations. This might explain the initial stable TMP in the CBR only operation. Typically, before the beginning of each different configuration testing, the content of the CT was discarded and filled with tap water. The prepared feed solution was then automatically fed into the CT according to the permeate production. This was not performed when the MFT was incorporated in order to examine the MFT. The TMP was stable at 0.1 bar for 10 hours during the CBR only configuration. A longer and lower initial TMP would be customarily expected when the MFT is included since the turbulence is handled by the MFT and lower in the CBR. However, a slow yet continuous increase was observed after 5 hours.

Even though a substantial improvement was observed, the TMP increase and flux decline was still an issue for the CBR MFT configuration. The operation lasted for 80 hours (10 semi continuous batches) and it could have been continued for more prolonged durations since the flux and TMP were stabilized. However, considerable solids accumulation in the MFT was observed. Therefore, a final configuration was tested with an outflow from the MFT and a new membrane module with the same surface area. The permeate flux was set at 48 LMH, while the concentrate and MFT outflow were set at 10% of the permeate flux (5% each).

The final configuration achieved a remarkable membrane performance. The set flux of 48 LMH was stable during the entire operation and showed almost no deterioration. The TMP also showed only a small increase which was 0.61 mbar/h. This value is 50 and 16 times lower compared to initial batch and CBR without MFT outflow operations, respectively (30.6 mbar/h and 10.1 mbar/h). The results indicate the importance of solids removal from the MFT. Even though the turbulence was prevented in the CBR, the constant permeate removal causes rapid solids buildup in the MFT which eventually becomes similar to the initial batch operations where solids concentration increases infinitely.

The pressure increase of 0.6 mbar/h is quite lower compared to the DMF studies in the literature. In one study, DMF of RS was tested with submerged MF PVDF membranes (0.1 µm, 1 $m^2$) using aeration (0.12 $m^3$/h) and coagulation (30 mg/L polyaluminum chloride) for fouling control. The process was operated for 295 hours and achieved an average net flux of 13.3 LMH. During the operation, membrane was also physically cleaned twice (around every 100 hours of operation) with a soft sponge. The fouling rate was reported as 5.5 to 6.7 mbar/h which was calculated based on approximately 100 hours of operation. However, when the flux was increased to 13 LMH, the fouling rate increased to 0.86 mbar/h. During the stable operation of 25 days, 0.17 mbar/h fouling rate was reported at 10 LMH flux and 90.1 $m^3/m^3$ specific gas demand per permeate volume.

Batch Mode Removal and Recovery:

Both WWs showed similar removal and rejection efficiencies in terms of COD, TN, and TP concentrations (Table 3, 4, and 5). The volume and COD CFs were 10.7-15, 5.5-8.2 and 10.8-12.6, 6.6-8.8 for synthetic and fresh WWs, respectively. This means that for an average 50% volume reduction, the COD concentration increased an average of 1.26 times in the final concentrate for both WWs. This also confirmed that the COPAS is a reliable surrogate for fresh WW.

TABLE 3

COPAS synthetic WW DMF batch mode operations water quality parameters.

| Parameters | 1$^{st}$ CF10 | 2$^{nd}$ CF10 | 3$^{rd}$ CF10 | 4$^{th}$ CF10 |
|---|---|---|---|---|
| Concentrate volume at the end of each batch run, L | 5.5 | 5.4 | 5.34 | 3.7 |
| Tap water used for rinsing volume at the end, L | 0.5 | 0.4 | 0.25 | 0.5 |
| Total filtration time, min | 212 | 220 | 335 | 740 |
| Total permeate production volume, gal | 14.95 | 14.9 | 14.95 | 15.5 |
| Total permeate production volume, L | 56.6 | 56.4 | 56.6 | 58.7 |
| Average flow rate, L/min | 0.267 | 0.256 | 0.169 | 0.079 |
| Average flow rate, L/h | 16.0 | 15.4 | 10.1 | 4.8 |
| Average flux, LMH | 64.1 | 61.5 | 40.5 | 19.0 |
| CF actual, by volume | 11.3 | 11.4 | 11.6 | 16.9 |
| CF after rinsing, by volume | 10.4 | 10.7 | 11.1 | 15.0 |
| CF after rinsing, by COD | 7.9 | 8.2 | 8.2 | 5.5 |
| Actual volume reduction, % | 91.1% | 91.3% | 91.4% | 94.1% |
| Volume reduction after rinsing, % | 90.4% | 90.7% | 91.0% | 93.3% |
| tCOD in the influent, mg/L | 500 | 500 | 500 | 500 |
| tCOD in the permeate, mg/L | 38 | 50.7 | 48.7 | 73.6 |
| tCOD in the concentrate, mg/L | 3956 | 4080 | 4090 | 2744 |
| tCOD in the total permeate, mg | 2150 | 2860 | 2756 | 4318 |
| tCOD in the total concentrate, mg | 23738 | 23664 | 22862 | 11526 |
| tCOD in the permeate and concentrate, mg | 25889 | 26524 | 25618 | 15845 |
| tCOD in the influent, mg | 31296 | 31101 | 31091 | 31437 |
| Solid total mass in the influent, mg | 27202 | 27033 | 27024 | 27325 |
| Solid total mass in the concentrate, mg | 20633 | 20569 | 19872 | 10019 |
| Solid total mass in the concentrate and permeate, mg | 22503 | 23054 | 22267 | 13772 |
| % tCOD rejection | 92.4% | 89.9% | 90.3% | 85.3% |
| % tCOD in the concentrate | 76% | 76% | 74% | 37% |
| % mass total retained in the reactor and membranes | 17% | 15% | 18% | 50% |
| % mass lost to perm. (with retained in the system) | 8% | 11% | 10% | 16% |
| % mass lost to perm. (without retained in the system) | 10% | 12% | 12% | 31% |
| % solids in the concentrate | 76% | 76% | 74% | 37% |
| Turbidity in the concentrate, NTU | >1000 | >1000 | >1000 | >1000 |
| Turbidity in the permeate, NTU | 0.73 | 0.74 | 0.80 | 1.83 |

TABLE 4

Fresh WW DMF batch mode operations water quality parameters (STDEVs were given in APPENDIX B)

| Parameters | 1$^{st}$ CF10 | 2$^{nd}$ CF10 | 3$^{rd}$ CF10 | 4$^{th}$ CF10 | Settled CF10 |
|---|---|---|---|---|---|
| Concentrate volume at the end of each batch run, L | 4.7 | 4.8 | 4.7 | 5.1 | 4.9 |
| Tap water used for rinsing volume at the end, L | 0.5 | 0.3 | 0.2 | 0.7 | 0.6 |
| Feed TS, mg/L | 634 | 616 | 767 | 806 | 2067 |
| Concentrate TS, mg/L | 2249 | 1787 | 2786 | 2308 | 8517 |
| Feed TSS, mg/L | 173 | 137 | 154 | 197 | 1102 |
| Concentrate TSS, mg/L | 1613 | 1207 | 1586 | 1637 | 7833 |
| Total filtration time, min | 335 | 425 | 575 | 727 | 550 |
| Total permeate production volume, gal | 15.0 | 14.2 | 15.1 | 15.0 | 15.0 |
| Total permeate production volume, L | 56.9 | 53.9 | 57.0 | 56.8 | 56.8 |
| Average flow rate, L/min | 0.17 | 0.13 | 0.10 | 0.08 | 0.10 |
| Average flow rate, L/h | 10.2 | 7.6 | 5.9 | 4.7 | 6.2 |
| Average flux, LMH | 40.8 | 30.4 | 23.8 | 18.8 | 24.8 |
| CF actual, by volume | 13.1 | 12.2 | 13.1 | 12.1 | 12.6 |
| CF after rinsing, by volume | 11.9 | 11.6 | 12.6 | 10.8 | 11.3 |
| CF after rinsing, by COD | 6.6 | 7.3 | 8.6 | 7.5 | 7.3 |
| Actual volume reduction, % | 92.3% | 91.8% | 92.4% | 91.8% | 92.1% |
| Volume reduction after rinsing, % | 91.6% | 91.4% | 92.1% | 90.7% | 91.2% |
| tCOD in the influent, mg/L | 303 | 294 | 355 | 366 | 1798 |
| tCOD in the permeate, mg/L | 85 | 57 | 49 | 47 | 310 |
| tCOD in the concentrate, mg/L | 2014 | 2137 | 3057 | 2738 | 13073 |
| tCOD in the total permeate, mg | 4837 | 3072 | 2793 | 2670 | 17608 |
| tCOD in the total concentrate, mg | 10513 | 10899 | 14979 | 15880 | 71902 |
| tCOD in the permeate and concentrate, mg | 15350 | 13971 | 17772 | 18550 | 89510 |
| tCOD in the influent, mg | 18822 | 17346 | 21975 | 22912 | 112015 |
| total TS in the feed, mg | 39090 | 36184 | 47352 | 49863 | 127540 |
| total TS in the concentrate, mg | 11738 | 9116 | 13652 | 13386 | 46846 |
| Total TSS in the feed, mg | 10629 | 8024 | 9514 | 12176 | 67975 |
| Total TSS in the concentrate, mg | 8417 | 6154 | 7771 | 9493 | 43083 |
| % tCOD rejection | 72% | 81% | 86.2% | 87.2% | %83 |
| % tCOD in the concentrate | 56% | 63% | 68% | 69% | 64% |
| % TSS retained in the reactor and membranes | 20.8% | 23.3% | 18.3% | 22.0% | 36.6% |

TABLE 4-continued

Fresh WW DMF batch mode operations water quality parameters (STDEVs were given in APPENDIX B)

| Parameters | $1^{st}$ CF10 | $2^{nd}$ CF10 | $3^{rd}$ CF10 | $4^{th}$ CF10 | Settled CF10 |
|---|---|---|---|---|---|
| % tCOD retained in the reactor and membranes | 18.5% | 19.5% | 19.1% | 19.0% | 20.1% |
| % tCOD lost to perm (with retained in the system) | 25.7% | 17.7% | 12.7% | 11.7% | 15.7% |
| % tCOD lost to perm (without retained in the system) | 31.5% | 22.0% | 15.7% | 14.4% | 19.7% |
| % solids in the concentrate | 30.0 | 25.2 | 28.8 | 26.8 | 36.7 |
| % suspended solids in the concentrate | 79.2 | 76.7 | 81.7 | 78.0 | 63.4 |

Total tCOD rejections were 85.3%-92.4% and 72%-87.2% for synthetic and fresh WW, respectively. COPAS run average rejection rates were slightly higher than fresh WW run. Thus, final concentrate tCOD concentrations were also higher which affected the permeate quality. This was due to the initial sCOD concentrations of the feedwaters. COPAS feed sCOD was 16% of the tCOD while fresh WW was 23%. This slight difference mostly likely affected the permeate COD concentration since soluble products can penetrate through the membrane. Initially, COPAS dissolve in the water at a slower rate. By mixing and circulation, COPAS further disintegrates and less particulate are present over time. This was observed in the final synthetic WW batch operation. Due to increased fouling and clogging, the flux was quite slow, and the process took more than 3 times higher than the initial operations. As a result of longer mixing and circulation, the particulates dissolved more which resulted in the lowest tCOD recovery rate compared to the initial runs. This effect was not observed in the fresh WW runs. In fact, the more the process duration, the less tCOD was present in the permeate. As a result of this, recovery rate was higher in the concentrate. This was first of all because that the fresh WW was more stable and increased duration of mixing and circulation did not cause as mush degradation as the synthetic WW. Initial sCOD was higher in the fresh WW which resulted in less tCOD in the concentrate, however, the permeate tCOD was in decline. This can be explained by the rapid cake layer formation. Cake layer can reduce the flux, but at the same time, it can be a barrier for the soluble materials. As a result of the initial rapid cake layer formation, more soluble products were captured over time by this barrier, which resulted in the lower permeate tCOD concentrations for the latter operations.

tCOD recovery rates were in the range of 37-76% and 56-69% in the synthetic and fresh WWs, respectively. The remaining solids either ended up in the permeate or stayed in the CT and membranes. Solids deposition on the CT is a common issue when WW is directly filtered. If not physically removed, solids could adhere on the containers and membrane surfaces which could reduce the final organic recovery rate. Aeration, which is a frequently used method for fouling mitigation in submergible membrane configurations, can also reduce the recovery rate by promoting bacterial growth and degradation. From this perspective, external cross flow configurations could have a better chance of handling membrane fouling and not lowering the concentrate quality.

TABLE 5

COPAS and fresh WW DMF batch mode operations water quality parameters

| COPAS operations | $1^{st}$ CF10 | $2^{nd}$ CF10 | $3^{rd}$ CF10 | $4^{th}$ CF10 |
|---|---|---|---|---|
| TP influent, mg/L | 31 | 31 | 31 | 31 |
| TP permeate, mg/L | 6.4 | 5.0 | 4.3 | 2.8 |
| TP concentrate, mg/L | 54.8 | 49.2 | 60.5 | 47.0 |
| TN influent, mg/L | 14 | 14 | 14 | 14 |
| TN permeate, mg/L | 2.5 | 1.2 | 3.7 | 4.8 |
| TN concentrate, mg/L | 138 | 142 | 148 | 130 |
| $NH_3$ influent, mg/L | $ND^1$ | ND | ND | ND |
| $NH_3$ permeate, mg/L | 1.3 | 0.8 | 0.9 | 0.8 |
| $NH_3$ concentrate, mg/L | 0.5 | 1.1 | 0.3 | 21.5 |
| TP CF by concentration | 1.8 | 1.6 | 2.0 | 1.5 |
| TN CF by concentration | 9.8 | 10.1 | 10.5 | 9.2 |
| TP rejection, % | 79% | 84% | 86% | 91% |
| TN rejection, % | 82% | 92% | 74% | 66% |

| Fresh WW operations | $1^{st}$ CF10 | $2^{nd}$ CF10 | $3^{rd}$ CF10 | $4^{th}$ CF10 | Settled CF10 |
|---|---|---|---|---|---|
| TP influent, mg/L | 10.0 | 7.1 | 10.5 | 13.5 | 49.5 |
| TP permeate, mg/L | 0.9 | 0.1 | 1.8 | 0.7 | 9.0 |
| TP concentrate, mg/L | 48.8 | 93.9 | 114.4 | 86.2 | 398.4 |
| TN influent, mg/L | 3.0 | 1.1 | 7.3 | 5.3 | 25.7 |
| TN permeate, mg/L | 12.4 | 9.4 | 17.8 | 15.4 | 60.0 |
| TN concentrate, mg/L | 100.0 | 72.4 | 110.6 | 94.2 | 415.6 |
| $NH_3$ influent, mg/L | 2.0 | 3.7 | 6.1 | 5.1 | 25.6 |
| $NH_3$ permeate, mg/L | 0.8 | 2.2 | 4.3 | 4.5 | 17.8 |
| $NH_3$ concentrate, mg/L | 0.8 | 1.0 | 3.2 | 2.3 | 18.9 |
| TP CF by concentration | 4.9 | 13.2 | 10.9 | 6.4 | 8.1 |
| TN CF by concentration | 11.7 | 8.7 | 8.2 | 7.0 | 7.9 |
| TP rejection, % | 91% | 99% | 83% | 94% | 82% |
| TN rejection, % | 71% | 69% | 66% | 62% | 63% |

TP and TN rejection rates were 79-91%, 66-92% and 82-99%, 62-71% for the synthetic and fresh WWs, respectively. These number were fluctuating and there was not a trend between the individual operations. For the final synthetic WW operation, ammonia concentration increased almost 20 times. This suggests that the increased duration of activity caused promoted biological growth to some extend in the CT which resulted in the degradation of proteins to ammonia. Initially, ammonia was not present in the synthetic feed solution. Therefore, it can only be available by the degradation of molecules. This was not however observed in the shorter duration operations.

Semi Batch/Continuous Mode Removal and Recovery:

These operations were mainly conducted in order to analyze the membrane fouling, therefore, not all parameters were measured. A constant 500 mg/L synthetic WW was fed into the CBR while concentrate, MFT outflow, and permeate were removed all at the same time. A final volume CF of 10 was achieved in all cases by only removing 10% concentrate and MFT content. An average permeate COD of 66±27 mg/L was obtained during the entire operation, reaching 87% average COD removal. Permeate never exceeded 100 mg/L.

Three COD measurements were made in the concentrate, one at the beginning (2700±110 mg/L), one in the middle (3790±171 mg/L), and one at the end (3520±157) of 118 hours operation. An average, a CF of 6.7 was achieved by COD concentration which was comparable to the batch CFs. It was observed that after 3-4 batches, the amount of solids in the concentrate stayed similar until the end of the process. Therefore, after these initial runs, the concentrate COD concentration were in the range of the middle and final measurements. When this is considered, the average CF is more likely closer to 7.2-7.5.

In order to determine the buildup in the MFT, samples were taken from the MFT and the top of the CBR CT where the liquid flows in the MFT. It was observed that the COD concentration in the MFT never exceeded 350 mg/L but the solids buildup over time was apparent. The MFT mass balance was also conducted to determine the final steady state concentration. Based on the average COD concentrations from the CBR effluent and permeate, very similar results were obtained. If an outflow was not included in the MFT, the COD concentration could increase to much higher values and cause membrane fouling. When compared with the previous run without an outflow from the MFT, the visible solids buildup was much higher. Therefore, the solids and organics in the MFT must be limited either by removing the content or treating this water with other processes.

It should be noted that CBR and MFT coupling performed excellent for both solids removal and turbulence reduction. Even though the solids were settling and building up at the bottom of the CBR tank, only a small portion solubilized. CBR effluent COD concentration never exceeded 175 mg/L. Therefore, removing the solids from the system in advance before they are being solubilized or contributing to membrane fouling is the key for achieving more extended DMF operations without compromising the membrane performance.

DMF of synthetic and fresh WWs showed promising results. While batch operations showed severe fouling around 30 hours, semi continuous operations with a concentrically baffled settling (CBR) tank showed extremely low fouling profile during a 118-hour process. While the membrane fouling rate was 30.6 mbar/h for the batch operation, 0.6 mbar/h was observed in the improved CBR design.

Both batch and semi continuous operations achieved a high recovery of organics and reliable permeate qualities. Overall COD, TN, and TP rejection rates were 85.5%, 88.4%, 72.8% for the batch operations, respectively. 64.9% of the initial COD was recovered in the concentrate stream, which can be used for energy recovery in anaerobic digestion process.

Semi continuous operation achieved an 87% COD rejection and permeate COD never exceeded 100 mg/L.

Fouled membranes were effectively cleaned with 500 ppm NaClO and citric acid. The 1-hour cleaning procedure completely removed irreversible fouling. Clean water flux tests revealed that chemically cleaned membranes achieved similar specific flux values as new membranes (1050 LMH/bar).

Example 3: Direct Membrane Filtration (DMF) and an Anaerobic Membrane Bioreactor (AnMBR) System for Wastewater Treatment

INTRODUCTION

The notion that the wastewater (WW) is considered as "waste" and only treated instead of recovered must change due to our perspective to achieve a sustainable future. In this perspective, WW can be a resource for water, nutrients, and energy. With an estimated 2.5 kWh/m$^3$ potential chemically bound energy and 35 Mt of nitrogen per year (assuming 10 gram/person/day on average globally) in WW, WWTPs can be net renewable energy producers and perfect medium for nutrient recovery. However, energy intensive activated sludge process, which can use between 0.3 to 1.89 kWh/m$^3$ energy, is still continued to be used which degrades the potentially recoverable organics into carbon dioxide and water. In order to achieve such desired recovery outcomes, direct membrane filtration (DMF) has emerged as a simple and efficient approach to separate the organics and nutrients. This technology allows producing a high-quality effluent and high-strength wastewater stream which can enable an increased water, nutrients, and energy recoveries when coupled with an anaerobic digestion (AD) process.

DMF refers to the utilization of various types and pore sizes of membranes in order to physically/mechanically separate/up-concentrate solids for further treatment applications. It is considered to be a robust, low footprint, and flexible technology that does not involve biological treatment. Therefore, it is recognized as an attractive option for decentralized treatment and sewer mining which is used for alleviating the pressure on water and wastewater infrastructure in urban cities, reducing the loading on sewer network and treatment plants, and allowing water and nutrient recycling for irrigation. DMF is also a promising approach for municipal wastewater (MWW) up concentration. MWWs are characterized by having low strength in terms of biodegradable organic fraction and high content of particulate organic matter. Therefore, the WW quality affects the efficiency of AD process when treating MWW. In fact, direct AD application on raw sewage has rarely been found due to the lower strength of MWW. The COD range for an optimum AD process needs to be at least 1500-2000 mg/L. However, the strength of typical MWW COD and total solids concentrations are in between 339-1016 and 537-1612 mg/L, respectively, with an average of 500 mg/L COD, due to the mixing of black water (fecal matter+flush water), yellow water (urine+flush water) and with significant amount of greywater (showers, sinks, laundry). By up concentrating the organics in MWW, a high-strength stream can be fed into ADs allowing for optimal energy recoveries in the form of methane.

DMF could potentially minimize the energy demand for the subsequent processes especially the heating requirements for ADs. Energy is frequently required to heat either the influent or the reactors for pretreating the WW, achieving increased removal rates due to increased reaction kinetics, and pathogen removal. Thermohydrolysis via heating, among many others, is also an effective pretreatment strategy for accelerating the disintegration and hydrolysis of particles and difficult-to-degrade complex substrates since they are the very first and often the rate-limiting steps of anaerobic degradation. In addition, anaerobic processes excel at mesophilic (35° C.) conditions for methanogenesis and thermophilic (55° C.) conditions for hydrolysis and acid production. My removing the majority of the incoming WW and reducing to only a fraction of the total influent through DMF process, heating becomes substantially suitable and energy efficient.

As is in MBRs, the main drawback of DMF systems is the membrane fouling which causes either a decrease in the flux or an increase in the operating pressure depending on the selected design. Therefore, flux decrease and TMP increase can be used as a fouling indicator in MBRs. A variety of different organics and compounds are responsible for membrane fouling. These include small colloidal and large suspended particles, inert and adsorptive macromolecules, small molecules, biological substances, and cations. These biological substances could contain extracellular polymeric substances (EPS) and cell debris which is generally associated with internal fouling. Depending on the operational conditions and membrane characteristics, different fouling mechanisms dominate the fouling. These are generally divided into fouling caused by pore blockages (mostly irreversible) and cake layer formation (mostly reversible). Initially, pore blocking causes the membrane fouling. During the later stages of operation, fouling due to cake layer formation mostly dominates. Cleaning for fouled membranes are generally divided into two categories: physical/mechanical and chemical methods. Physical cleaning methods are based on hydrodynamics, turbulence applications, and temperature effects in order to kinetically disrupt the foulants to leave the membrane interphase. Chemical cleaning methods aim to change the chemistry of the solution and the electrostatic repulsion between the membrane and the foulants, or completely degrade them into the liquid stream.

Different fouling prevention methods have been used for either mitigating membrane fouling or cleaning a fouled membrane. The most common noninvasive fouling control methods include backflushing with air, backwashing (BW) with permeate or DI water, relaxation (RX, pausing the filtration for short period of time), using scouring agents such as granular activated carbon (GAC), powdered activated carbon (PAC) for breaking down the dynamic membrane layer and soluble organics removal. These physical/mechanical cleaning (PC) methods are often applied during the filtration process for lowering the cake layer formation and removing the pore clogging. The most common methods are the applications of relaxation and backwashing for short periods of time. During relaxation, concentrated foulants responsible for reversible fouling at the membrane surface diffuse away via the concentration gradient. Almost all recent studies use RX and BW to some extend for fouling control and reported positive effects. However, an optimization for their frequency is needed since RX and BW increases the process down time. GAC and PAC addition have recently been studied and found to be an effective and efficient way of removing foulants. Compared to with or without gas sparging submerged MBRs, the use of scouring agents with bulk recirculation significantly lower the energy requirements from an average 1.2 kWh/m$^3$ to 0.2 kWh/m$^3$. However, when compared to coagulant treated secondary effluents, GAC resulted in the lowest flux increase and reported to be only effective on internal fouling by removing soluble products. Also, steady replacement of PAC is necessary, otherwise, saturated PAC particles could have adverse effects on flux.

Other than intensive cleaning with chemicals for fouled membranes, frequent enhanced backwashing techniques were also applied using various chemicals during the filtration processes. The most common and useful chemicals are NaClO and citric acid for inorganic and organic fouling removal for both enhanced backwashing and intensive cleaning. HCl, NEDTA, EDTA, $H_2O_2$, and NaOH are the other chemicals that were tested for DMF process membrane cleaning. While all these methods show a successful cleaning, the best results achieved with NaClO and citric acid when compared with other methods. Except enhanced BW, chemical cleanings (CCs) are often applied offline for completely fouled membranes. First, an initial PC with a jet of DI or tap water and soft sponge is carried out to remove any cake layer. The remaining fouling after this initial cleaning is often referred as irreversible or internal fouling which can only be removed with CC. Although CC can remove all foulants, it can add to the overall cost and complexity while shortening membrane lifespan, therefore, the use of chemicals must be minimized.

While chemicals are quite effective for fouling control, different methods were also examined. These include coagulant addition for particle and colloidal removal and micro sieving prior membrane filtration, vibration, and mixing for membrane scouring effects. Intensive chemical cleanings are generally applied offline for a short period of time to achieve a complete membrane cleaning and flux recovery. Other methods are typically practiced for delaying the complete fouling and expanding the membrane operation without compromising for an increased pressure or lower flux.

In this example, we investigated the feasibility of a laboratory scale DMF system in combination with an AnMBR in order to enhance the recovery of organic matter and potential energy from raw wastewater. The DMF system design was chosen based on our previous testing which consisted of a concentrically baffled reactor (CBR) concentration tank to achieve better solids separation.

Materials and Methods:

The DMF-AnMBR setup consisted of two separate systems. First, wastewater is up-concentrated in the DMF process. The concentrated stream was then fed in the AnMBR.

DMF System:

A 24-gal (90 liters) concentrically baffled concentration tank (CT) was designed and constructed out of polypropylene (SW Plastics, Clearwater, Fla.). A concentrically baffler reactor (CBR) design was chosen due to its plug-flow-like configurations and its efficiency achieving improved solids settling. This design was further improved by a secondary bottom for allowing better solids separation. Also, in order to prevent any back flow and solids rising, hanger baffles were included. For better membrane performance, other than the concentration tank, a membrane feed tank (MFT) was added using a 5-gal carboy container (3422890050, Thermo-Scientific, Waltham, Mass.). For membrane filtration, 5.2 mm diameter polyvinylidene fluoride (PVDF) X-Flow ultrafiltration (UF) tubular membranes (Pentair, Minneapolis, Minn.) were used in external cross-flow configurations. The membrane had a nominal pore size of 0.03 µm and 0.25 m$^2$ effective area. The system consisted of five pumps: one centrifuge pump for wastewater circulation (Magnus VSG-6000, Sunpole, Naka-ku Hiroshima, Japan), four peristaltic pumps for feeding, permeation, backwashing, and concentrate removal (Cole Parmer, Vernon Hills, Ill.). The membrane was also equipped with three pressure transducers for determining the trans membrane pressure (TMP) (Cole-Parmer, EW-68075-32, Vernon Hills, Ill.). The transducers were placed at the feed ($P_F$), concentrate ($P_C$), and permeate ($P_P$) sides of the membrane module. Pressure was constantly recorded (1 second sampling 1 min logging intervals) using HOBOware software (ONSET, U30, Bourne, Mass.). Transducers registered a voltage reading depending on the pressure. These voltage readings were later used to calculate the TMP (TMP=(($P_F$+$P_C$)/2–$P_P$)). For handling filtration, relaxation, backwashing cycles, and automatic feeding, a custom-made control system was designed. The cycle started with a 90 sec filtration, followed by a 15 sec relaxation, and 20 sec BW every 15 min at 32 LMH. RX and BW corresponded to a 15.2% off time during the operation (140 sec off every 920 sec).

AnMBR System and Inoculum:

The laboratory-scale AnMBR consists of an upflow anaerobic bioreactor with an effective volume of 12 liters and 1 liter of headspace and a custom-made external cross-flow ultrafiltration (UF) module using polyvinylidene fluoride (PVDF) membranes with a nominal pore size of 0.3 µm and a membrane area of 0.075 m² total (Pentair X-Flow; Enschede, The Netherlands). For heating, a stainless-steel aquarium heater controlled by a proportional integral derivative (PID) heating controller was inserted at the bottom of the reactor where the influent is fed. The temperature of the reactor was continuously monitored using inline sensors. Two temperature probes were installed at the lower and upper part of the reactor. The module is equipped with three pressure transducers (placed at the feed, concentrate, and permeate connections) (Cole Parmer, Vernon Hills, Ill.) for measuring the transmembrane pressure (TMP) and data acquisition is done using the HOBOware software. For membrane circulation, permeate production, and backwashing, four peristaltic pumps were used (Cole-Parmer; IL, USA).

The reactor was inoculated with an active biomass of 12 g/L volatile suspended solids (VSS) concentration from a local wastewater treatment plant's anaerobic digester after sieving through 1.7 mm maximum particle diameter sieve (Howard F. Curren Advanced Wastewater Treatment Plant; Tampa, Fla.). Biogas, reactor temperature, and permeate were continuously monitored using HOBO data loggers (Onset Computer Corporation; MA, USA). For handling filtration, relaxation, backwashing cycles, and automatic feeding, a custom-made control system was designed. The cycle started with a 75-sec filtration followed by a 15-second relaxation and a 15-second backwashing at every 8$^{th}$ cycle (every 12 min at 0.045 L/min flow rate). The reactor hydraulic retention time (HRT) is chosen as 2.5 days and operated at mesophilic conditions (36° C.±1). The instantaneous flux is set to 4 LMH (L/m²/h) throughout the experiment. The effective flux was 3 LMH when BW and RX downtime incorporated. The cross-flow velocity (CFV) was chosen as 0.1 m/s (0.51 L/min). The membrane feed was taken from the upper part of the reactor. The concentrate stream from the membrane module was returned to the bottom of the reactor where the concentrated synthetic sewage was fed. The membrane was never chemically cleaned during the 175-day operation. Except sampling, no biomass was wasted.

Complex Organic Particulate Artificial Sewage (COPAS), which is essentially the granulated cat food, was used to mimic real sewage as previously reported (Prieto et al., 2013). COPAS is composed of 92% volatile solids and 8% ash. Proteins, carbohydrates, and lipids composition are 40%, 43%, and 17%, while the elemental composition of carbon, nitrogen, and phosphorous were 48.1%, 6.35%, and 1.57%, respectively. The chemical oxygen demand (COD) and total solids (TS) of COPAS used were chosen as 1000 mg/L and 860 mg/L in order to mimic the low strength municipal wastewater characteristics (tCOD/wt ratio, y=1.17). The influent had TN and TP concentrations of 61.4±1.8 mg/L and 28±3 mg/L, respectively.

TABLE 6

Feed characteristics for 1000 mg COD/L synthetic COPAS WW

| | COPAS | |
|---|---|---|
| Parameters | Concentration, mg/L | STDEV |
| TS | 835.4 | 30.6 |
| VS | 614.6 | 20.4 |
| TSS | 396.8 | 25.0 |
| VSS | 336.2 | 19.4 |
| tCOD | 1000 | 86.0 |
| sCOD | 166 | 8.0 |
| fTP | 61.4 | 1.8 |
| sTP | 14.8 | 1.6 |
| tTN | 28.0 | 3.0 |
| sTN | 6.0 | 0.8 |
| NH$_3$ | ND[1] | NA[2] |

[1]ND: not detected;
[2]NA: not applicable

Feeding and Operation Cycles:

During the 175-day AnMBR operation, five different operation cycles were tested in terms of feed characteristics. First 96 days, the AnMBR was fed with 1000 mg/L COD synthetic WW. During this period, only the AnMBR was operated until it reached pseudo steady state conditions. After this initial period, the DMF process was started and operated in parallel to the AnMBR with different concentration factors (CF). Initially, the DMF system was operated at CF3.3 for 28 days. For each cycle during the CF3.3 operation, feed for the DMF was prepared in a separate tank and fed continuously until the process was terminated approximately after 2 hours and 15 minutes for each cycle. For feed preparation, 9 gallons of tap water was mixed with 28 g of COPAS to achieve a COD concentration of 1000 mg/L. This concentration was kept the same during the entire DMF testing. To achieve a CF3.3, 6 gallons of permeate (22.7 L) and 3 gallons (11.4 L) of concentrate was produced. The concentrate was then fed into the AnMBR. The instantaneous flux was set to 43 LMH. During this CF3.3 testing, the DMF system was operated every other day. The concentrate and MFT outflow rates were set to 2.53 L/h both.

Next, the DMF system was operated at CF6.6 for 22 days. For each cycle during the CF6.6 operation, feed for the DMF was prepared in a separate tank and fed continuously until the process was terminated approximately after 5 hours and 45 minutes. During this period, 21.2 gallons (80.3 L) of tap water was mixed with 68.8 g COPAS to achieve a COD concentration of 1000 mg/L. To achieve a CF6.6, 18 gallons of permeate (68.2 L) and 3.2 gallons (12.1 L) of concentrate was produced at 2.1 L/h. The concentrate was then fed into the AnMBR. The instantaneous flux was set to 50 LMH. During this CF6.6 testing, the DMF system was operated every other day.

Finally, the DMF system was operated at CF10 for 14 days. For each cycle during the CF10 operation, feed for the DMF was prepared in a separate tank and fed continuously until the process was terminated approximately after 6 hours. During this period, 20 gallons (75 L) of tap water was mixed with 65.2 g COPAS to achieve a COD concentration of 1000 mg/L. To achieve a CF10, 18 gallons of permeate (68.2 L) and 2 gallons (7.5 L) of concentrate was produced at 1.25 L/h. The concentrate for DMF operation was then fed into the AnMBR. The instantaneous flux was set to 50 LMH. During this CF10 testing, the DMF system was operated every day. With this final testing, DMF system was operated a total of 181 hours (33.8 h CF3.3, 63.3 h CF6.6, 84 h CF10).

After the DMF process, the AnMBR was operated for 14 more days with an increased COD concentration of 12700 mg/L to test the limits of the AnMBR.

Monitoring Parameters and Analytical Methods:

AnMBR and DMF system was operated a total of 175 and 64 days, respectively. Permeate and concentrate samples were analyzed for total solids (TS), volatile solids (VS), total suspended solids (TSS), volatile suspended solids (VSS), total chemical oxygen demand (tCOD), soluble chemical oxygen demand (sCOD), total nitrogen (TN), ammonia ($NH_3$—N), phosphorous ($PO_4$—P), total organic carbon (TOC), and turbidity. All CODs, TN, $NH_3$—N, TP, were measured weekly using Hach HR digestion vials and Hach Testin Tube™ vials (Hach company, CO, USA). Reactor content was centrifuged at 3000 RPM for 20 minutes and the supernatant was used to measure the soluble fraction. TOC was measured using a Total Organic Carbon analyzer (Shimadzu, Kyoto, Japan) equipped with non-dispersive infrared detector (NDIR) and ASI-5000 autosampler using zero grade air as carrier gas (AI Z200; Airgas, Stafford, Conn.). For some samples, TN were measured with the TOC analyzer coupled with a Total Nitrogen detector (Shimadzu TNM-1). The semi batch/continues DMF operation lasted 181 hours (33.8 h for CF3.3, 63.3 h for CF6.6, 84 h for CF10). At the end of each cycle, permeate, concentrate, DMF CT content, and MFT samples were collected and analyzed for tCOD. TN and TP were only tested weekly for permeate and concentrate samples.

Membrane Cleaning Procedure:

After 181 h operation, DMF system membrane cleaning was conducted. First, the membrane was taken offline and physically cleaned with a jet of tap water. After this initial physical cleaning, a clean water flux (CWF) test was done in order to determine the reversible and irreversible fouling. In this study, membrane resistances before and after physical and chemical cleanings were used to define the irreversible and reversible fouling. Next, 500 ppm NaClO solution was prepared in tap water. The membrane was operated with only the circulation and backwashing (BW) pumps were on for 30 min. BW was applied at 32 LMH. Next, the membrane was characterized with tap water for 30 min at 32 LMH. After the characterization, the same procedure was repeated with 500 ppm citric acid (Decon™ 4401, Orlando, Fla.). Finally, the membrane was characterized with tap water and tested for clean water flux (CWF) to determine the effectiveness of the cleaning procedure.

Results and Discussion:

Our previous studies showed that the solids concentration was directly affecting the membrane fouling rate, hence maintaining a batch operation where the WW is concentrated without any solids removal caused severe membrane fouling after approximately 30 hours. Therefore, removing the solids during the filtration was the key to achieve a sustainable membrane operation. By incorporating a concentrically baffled settling tank, the membrane fouling was successfully mitigated achieving 0.61 mbar/h fouling rate during 117-h operation, which was 50 times lower than our 30-hour long batch operations (30.6 mbar/h).

For the DMF-AnMBR integration, the DMF system was operated for 180 hours with different concentration factors (CF) at CF3.3, CF6.6, and CF10. During this 180-hour operation, the fouling rates were 0.16, 0.77, and 0.63 mbar/h, respectively, with an average of 0.52 mbar/h. Previously, an average fouling rate of 0.61 mbar/h was achieved for 117-h operation which is slightly higher than the average fouling rate in this configuration. The lower initial and average fouling rates were achieved due to the lower CF applied during the DMF-AnMBR operation. While the CF was increased over time, initial CF was set at 3.3, however, for the previous 117-h operation, a CF6.6 was kept thought the entire experiment, which could explain the slightly higher fouling rate. The TMP profile showed similar pattern for both DMF operations since the same membrane module used for both studies. This also shows the effectiveness of the chemical cleaning procedure for removing the irreversible fouling.

The effective fluxes and flux declines for the three different CFs were 40.5, 47.2, 46.4 LMH and 5.7%, 5.7%, and 7.2%, respectively. These flux declines were calculated based on the instantaneous fluxes and only caused by the frequent RX and BW and was not as a result of the fouling. During RX and BW, no permeate was produced, therefore, the membrane on time was reduced. For batch operations, an apparent flux decline was observed, which caused a final flux of 10-20 LMH after 30-hour operation.

Compared to the numbers found in the literature, our study resulted in the lowest fouling rate when flux is considered. Jin et al. (Jin et al., 2016 Efficient sewage pre-concentration with combined coagulation microfiltration for organic matter recovery. *Chemical Engineering Journal*, 292, 130-138.) tested the DMF of raw sewage (RS) with PVDF hollow-fiber microfiltration membranes (0.1 µm, 1 m$^2$). The WW was pretreated with 30 mg/L polyaluminum chloride. RX and intermittent aeration were also used for fouling mitigation. They report an average 6.1 mbar/h fouling rate at an average effective flux of 13.3 LMH approximately 100-hour operation before any cleanings. Nascimento et al. reported the lowest fouling rates among other studies. They used primary effluent for their study with PVDF hollow-fiber submerged membrane (0.04 µm, 0.93 m$^2$) unit.

Gas sparging, RX, and BW were used for fouling mitigation. They tested different fluxes and gas sparging rates to accommodate the increased fluxes. Initially, a 0.008 mbar/h was achieved at a flux of 4.7 to 7.1 LMH at 53.6 to 56.3 m$^3$/m$^3$ aeration rate. However, increasing the flux to 9.4 LMH caused a substantial increase in the fouling rate to 0.54 mbar/h even though the aeration rate was raised to 69 m$^3$/m$^3$. The increase in the flux continued to increase the fouling rate. At a flux of 13 LMH, the fouling rate was reported to rise to 0.86 mbar/h at 67.8 m$^3$/m$^3$ aeration rate. Gong et al. studied almost an identical process as Jin et al. (Gong et al., 2017 Organics and nitrogen recovery from sewage via membrane-based pre-concentration combined with ion exchange process. *Chemical Engineering Journal*; Jin et al., 2016). They used RS as influent and PVDF hollow-fiber microfiltration membranes (0.3 µm, 0.33 m$^2$) for DMF. Coagulants, RX, and air backflushing were used for membrane mitigation. The only difference was the use of powdered activated carbon (PAC) at 10 mg/L concentration. During the 600-hour operation, the average membrane fouling rate was 1.2 mbar/h which was around 5 times lower than what Jin et al. reported.

Considering the average effective fluxes were similar around 13.3 LMH, the PAC alone showed a quite positive effect on the membrane fouling rate. One study that was closer to our design flux (50 LMH) was reported by Zhao et al. for the DMF of RS using ceramic hollowfiber ultrafiltration membranes (0.01 µm, 0.04 m$^2$) (Zhao et al., 2019 Direct filtration for the treatment of the coagulated domestic sewage using flat-sheet ceramic membranes. *Chemosphere*.). 15 mg/L aluminum chloride, BW, RX, and gas sparging (0.1 L/min) were used for fouling mitigation. The process was continued for 700 hours at 41.7 LMH with several chemical cleanings (8 times with different chemicals) once the TMP reached to 0.35 bar. During this 700-hour operation, an average fouling rate of 4 mbar/h was estimated, which is approximately 8 times higher than our average fouling rate. At a CF3.3 the fouling rate of the present example was 0.16 mbar/h, at a CF6.6 the fouling rate was 0.77 mbar/h, at a CF10 the fouling rate was 0.63 mbar/h, with an average of 0.52 mbar/h.

DMF Concentration, Rejection, and Recovery:

DMF process showed an excellent performance and achieved an overall COD rejection of 85.6% for the entire operation (88.6%, 83%, and 78.4% for CF3.3, CF6.6, and CF10, respectively) (Table 7). A slight decrease in the rejection rate was expected due to the increase in the overall soluble COD in the CBR concentration tank and MFT. Due to the increased concentration and mixing, as a result of membrane return flow (34.6 L/min flow rate or CFV of 1.43 m/s) in the MFT, the soluble products concentration elevated. In fact, the COD concentration in the MFT more than tripled during the CF10 cycle compared to CF3.3. Since the MFT content was directly fed into the membrane, any concentration changes directly affected the permeate quality. Overall COD loss to permeate was around 15% during the entire DMF operation.

Organics recovery in terms of tCOD was also successful and achieved a 69% recovery rate. When the process was first started with CF3.3, the steady state conditions were not reached, therefore, only a CF of 1.2 was achieved in terms of tCOD concentration in the concentrate stream. After a steady solids buildup was established in the later CF6.6 cycle, the recovery rate was increased to 85%. While the increase from CF3.3 to CF6.6 was substantial, this pattern did not continue for the CF10 cycle and only achieved a 69% recovery. This suggests that some of the solids in the CF3.3 run might have continued to build and was eventually recovered in the CF6.6 cycle. The substantial retaining (51.1%) in the system during the CF3.3 operation also supports this opinion especially a quite lower concentration of organics was retained in the CF6.6 cycle (0.1%).

Compared to the other studies, 69% COD recovery in the concentrate stream is superior in the our DMF operation. The numbers in the literature are quite variable from 23.8% to 57.5%. Others also report from 70% to 90% when cake, deposits, and mineralized fractions are included.

When WW is process in DMF system, organics can be recovered, solubilized and leave in the permeate, mineralized, and accumulate in/on the membranes and concentration tank. There are many factors that affect the recovery rate such as the type and pore size of the membranes, tank design, membrane orientation, different fouling mitigation techniques, and recovery methods. In all the studies that reported COD recovery rates and compared in our study use a submergible membrane module which often requires aeration for membrane scouring and mitigation. This can be problematic since aeration causes increased energy consumption, promotes biological growth, and reduces the organics due to degradation. Therefore, there is a tendency of using less or intermittent aeration for DMF and MBRs. External cross-flow filtration operations on the other hand, is capable of almost completely eliminating this issue since it does not require aeration.

Additionally, it can effectively remove the cake layer formation which causes solids buildup and flux decline. Our CWF results at the end of the DMF process indicate that the main fouling was caused by the irreversible fouling and not from the cake layer formation. Aeration could also disrupt solids that is already settled in the concentration tank. Depending on the membrane orientation and tank design, this could be problematic for solids recovery. In most of the DMF studies that use submergible membrane configuration, the solids were either removed a couple of times or once at the end of the process. While this can eliminate the energy to frequently remove the solids from the system, it could promote biological growth, biodegradation, and solubilization, which can cause more fouling and deposition in the long run. Therefore, removing the solids while the process is operated is ideal for better membrane performance and organics recovery. It should also be noted that the concentration tank design affects the recovery rate. While the solids settle down the reactor, a conical bottom helps better recover the solids that are otherwise could deposit on the flat surfaces.

Similar to COD, significant TP and TN rejection rates were achieved with an 86% overall rejection for TP (91.9% for CF3.3, 84.5% for CF6.6, and 81.6% for CF10) and an 75% overall rejection for TN (84.2% for CF3.3, 74.5% for CF6.6, and 66.7% for CF10), respectively (Table 7). While the TN results are very variable, similar tTP rejection rates were reported by others ranging from 82% to 90.9% for TP and 10% to 56% for TN. The low and high variability in the TN rejection rates could be as a result of nitrification process in the presence of aeration which was not observed in our study. Ammonia is often considered to be a small enough molecule that can pass through the membrane.

While the rejections were high, the concentrate tTN concentrations resulted in higher tTN than what was present in the feed WW during the CF6.6 and CF10 cycles which was most likely as a result of some biodegradation in the concentration tank. Ammonia concentration also suggested this opinion since it was found in the permeate while no ammonia was present in the feed WW.

AnMBR Performance:

The reactor has achieved an 87.8% overall COD removal efficiency (first 50 days were excluded). During startup, the efficiency was 78% with an average permeate COD of 211±24 mg/L. This increased to 91% after changing the feed stream to the DMF concentrate even though the influent COD was similar (1233±480 mg/L). The almost immediate increase was most likely due to the increased soluble fraction in the DMF concentrate, which was around 2 times higher than the initial soluble fraction.

Similar results were also observed during the CF6.6 and CF10 cycles and the removal efficiencies were 93% and 96%, respectively. During these operations, soluble fractions of the influent increased more than 10 times, which also resulted in much higher biogas production. On average, biogas production increased 1.6, 6.3, and 9.7 times when DMF concentrate stream was fed into the AnMBR at CF3.3, CF6.6, and CF10, respectively. This increase is quite impressive especially when the influent tCOD fluctuations are considered. On average, one time increase in the influent tCOD resulted in 1.3 times higher biogas production. Influent tCOD and biogas production also showed a good linearity at all stages. Overall tCOD removal efficiency was around 93% during the DMF-AnMBR integration, which means that a 15% increase was provided by the DMF process compared to the initial AnMBR startup period. Therefore, this clearly shows that DMF of raw sewage could enhance the overall removal efficiency by conditioning and increasing the hydrolyses rate of WW. Detailed information is given in Table 8.

If there is no inhibition due to substrate overloading, the biogas production increases as the OLR increases. Also, the optimal OLR will depend on the chemical characteristics of the influent. OLR numbers for ADs can vary from 2.5 g VS/L-d to 8.62 g VS/L-d with different type of reactors and influents. Similar sustainable OLRs were also reported for AnMBRs treating synthetic WW at mesophilic and thermophilic conditions.

After the DMF process was terminated, the influent tCOD concertation was doubled for two more weeks to examine the AnMBR performance. This caused an immediate increase in the biogas as well as reactor's sCOD. However, the removal efficiency started to decrease as a result of excessive COD buildup in the reactor. The average TSS concentration increased from 14 g/L to 25 within two-week period. The increase in the sCOD concentration in the reactor also started to penetrate the permeate. While the average COD concentration was 341±26 mg/L in the CF10 cycle, the two-week excessive influent feeding caused more than 7 times increase in the average COD concentration. Before the termination, around 3000 mg/L permeate COD was measured. This clearly shows that the reactor was not able to adapt with the increased organics and an optimum organic loading rate needs to be established.

The average organic loading rates were 0.53±0.02, 0.71±0.53, 2.59±0.53, 3.24±0.45, and 4.18±1.07 g COD/L-d (0.33±0.01, 0.41±0.17, 1.98±0.23, 2.98±0.85, and 3.07±0.69 g VS/L-d) for startup, CF3.3, CF6.6, CF10, and final cycles, respectively. Our results indicated that around 4 g COD/L-d OLR was sustainable, however, increasing the OLR to 5.5 g COD/L-day inhibited the reactor. One reason that led to the inhibition of our AnMBR could be due to the immediate large increase in the OLR rather than stepping up the concentration. In both studies, OLRs were slowly increased rather than an instant jump which may have given the chance to adapt for the microorganisms. Free ammonia is also a common inhibitory constituent in AD process. The threshold concentration can vary from 53 mg/L to 1450.

Energy Consumption and Recovery:

Energy recovery potential from the dilute municipal wastewater (e.g. 1000 mg/L) with the integration of DMF-AnMBR system depend on several factors such as influent temperature, AnMBR operating conditions, and effective energy production from the combined heat and power (CHP) systems. Influent temperature is often the key factor determining the energy recovery for the optimal mesophilic AD process due to the large water specific heat of 1.16 kWh/m$^3$-° C. To overcome this issue, a heat pump technology that uses the heat energy from the AnMBR permeate at 35° C. was suggested. By utilizing this technology, influent energy demand can be reduced by 75% compared to direct influent heating.

Based on the DMF-AnMBR integration at CF10 stage, different energy recovery scenarios were compared. For these scenarios, several assumptions and calculations were conducted. Energy consumptions were determined based on a pilot scale AnMBR energy data treating toilet wastewater, which was collected over 3-month period. In this study, two different energy demands were reported for treating around 200 and 1000 L. When the system was operated at closer to its design values (e.g. 1000 L), the energy demand was around 0.16 kWh/m$^3$. While treating 200 L influent, the energy demand increased to 0.83 kWh/m$^3$. For comparison, both energy demands were separately used to calculate the overall energy demand and consumption. DMF energy demand was determined based on our laboratory study and the field data. During the entire operating period, the average electrical current used for the AnMBR and DMF was 1.39 Amp and 1.14 Amp, respectively.

Based on this, an energy demand for the energy balance was extrapolated from the field AnMBR energy data. The pilot scale study is operated quite similar to our lab scale setup. Similar filtration and reactor systems and operating conditions were used except that the reactor was not heated. Since our biogas and methane production depends on the mesophilic AnMBR operation, a heating energy demand was determined based on the potential energy loss for the system with the assumption of 10 m$^2$ reactor surface and styrofoam insulation for the entire reactor. For methane conversion, an energy yield of 800 kJ/mol, 33% CHP system efficiency, 95% inverter, 80% motors to driver axial pumps, and 85% impeller efficiencies were assumed. This gave an overall 21% methane to electricity efficiency. For comparison, another CHP efficiency assumption was also made based on the utilization of waste heat from CHP systems, which is stated to be around 80-85%. For methane production, the average methane production data at CF10 stage was used, which was 9.2±1.2 L/d. For energy losses, 4 different ambient temperatures were selected at 10, 20, 25, and 30° C.

Based on these assumptions and calculations, energy demand and production rates were tabulated in Table 9. It can be seen that the energy production at 200 L influent without a DMF process was not able to offset the energy demand at any circumstances. While the energy production is enough to neutralize the base AnMBR energy demand with no influent heating, more energy is needed for the heat loss. Similar results were also found for the 1000 L influent without DMF process except that at higher CHP efficiency and no influent heating, the energy production can be used to offset the demand. The integration with the DMF process, on the other hand, was able to provide more energy for the overall system at the same influent characteristics. It was found that this combination provided the highest methane potential energy at 15.54 kWh. The process can handle all background energy and losses without influent heating. It can also be energy surplus with a permeate heat pump and more efficient CHP system. However, at low temperature climates, heating is still challenging and the efficiency of DMF-AnMBR integration must be increased to offset this energy demand.

A comparison between different studies for the potential energy recovery in the concentrate stream per treated influent in the DMF is given in the table below.

TABLE 10

| Process | Potential Energy (kWh/m$^3$) Treated WW in DMF |
| --- | --- |
| Example 3 (DMF-AnMBR) | 0.52 |
| Lateef et al. (2013)[1] | 0.21 |
| Gong et al. (2015)[2] | 0.19 |
| Jin et al. (2016)[3] | 0.16 |
| Nascimento et al (2017)[4] | 0.47 |
| Jin et al (2017)[5] | 0.16 |
| Gong et al (2017)[6] | 0.21 |

[1]Lateef et al. (2013) Direct membrane filtration of municipal wastewater with chemically enhanced backwash for recovery of organic matter. *Bioresource Technology*;
[2]Gong et al. (2015) Membrane fouling controlled by coagulation/adsorption during direct sewage membrane filtration (DSMF) for organic matter concentration. *Journal of Environmental Sciences (China)*, 32, 1-7;
[3]Jin et al. (2016). Efficient sewage pre-concentration with combined coagulation microfiltration for organic matter recovery. *Chemical Engineering Journal*, 292, 130-138;
[4]Nascimento et al. (2017). Improvement of municipal wastewater pretreatment by direct membrane filtration. *Environmental Technology (United Kingdom)*, 38(20), 2562-2572;
[5]Jin et al. (2017) Improved low-carbon-consuming fouling control in long-term membrane-based sewage pre-concentration: The role of enhanced coagulation process and air backflushing in sustainable sewage treatment. *Journal of Membrane Science*;
[6]Gong et al. (2017) Organics and nitrogen recovery from sewage via membrane-based pre-concentration combined with ion exchange process. *Chemical Engineering Journal*.

This table shows the importance of concentration efficiency and higher flux operated DMF process. With a 300 L reactor, 2250 g COD was recovered during the 144 h of operation. When theoretically computed (350 mL methane/g COD and 800 kJ/mol through combustion), this resulted an energy production of 2.6 kWh energy at 33% CHIP efficiency. While our results only produced 0.52 kWh (using our AnMBR methane production for estimation at 33% CHIP efficiency), this energy produced only treating 1 $m^3$ influent. Since Gong et al. energy was produced through processing 14 $m^3$ influent with 24 $m^2$ membrane module, this resulted a much lower energy production per treated influent, which highlights the importance of a higher flux operation. 14 $m^3$ influent processing in 144 h might seem higher, however, the membrane module used for this study was 96 times higher than our module (0.25 $m^2$). It should be also noted that in all DMF filtration studies reported here, either a theoretical calculation or biological methane potential (BMP) test were conducted. Best to our knowledge, there was not a DMF-AnMBR application studied before.

DMF Effective Membrane Cleaning:

After the DMF was completed, the membrane was physically and chemically cleaned in order to determine the reversible and irreversible fouling. The 2-hour chemical cleaning procedure was able to completely clean the membrane and a CWF of 1065 LMH was achieved.

Our results revealed that 83% of membrane fouling was caused by irreversible fouling while reversible fouling was only a small fraction of 13% (membrane resistances before physical cleaning, after physical cleaning, and after chemical cleaning are $1.34 \times 10^{12}$ $m^{-1}$, $1.18 \times 10^{12}$ $m^{-1}$, $3.85 \times 10^{11}$ $m^{-1}$, respectively). These fouling behaviors indicate that external cross flow configuration was indeed extremely effective for removing the cake layer and managing its formation. As a result of this, no flux decline was observed in our 180 h DMF operation. Even though a minimal cake layer formation was measured, irreversible fouling was detected in the membrane. This was mainly due to the increased soluble solids fraction in the MFT. It should be noted that the membrane module used in this study was previously tested with the same synthetic WW around 300 hours. During these testings, the membrane was three times chemically cleaned with the same procedure. In all these cases, a CWF of above 1000 LMH/bar was achieved. The initial CWF was around 1050 LMH/bar, therefore in each case, the membrane was completely cleaned.

An integrated lab scale DMF and AnMBR system to treat dilute municipal wastewater was designed and operated. While the AnMBR was operated for 175 days, the integrated system was tested for 65 days. During the initial startup period for the AnMBR, the reactor was fed with 1000 mg/L synthetic WW. After the startup, the DMF process was operated at different concentration factors (CF) for creating a high strength WW for the AnMBR. The produced concentrate stream was then fed into the AnMBR during the latter stage at CF3.3 for 28 days, CF6.6 for 20 days, and CF10 for 15 days, respectively. During the DMF-AnMBR integration, the objective was to determine the DMF membrane performance and fouling characteristics and AnMBR response for the high strength WW. Finally, the AnMBR was overloaded to determine the optimum OLR. During this period, the DMF system was fed around 5.5 g COD/L-d OLR for 14 days. Our results reveal that DMF process can be operated at higher fluxes without any deterioration in the overall throughput. This was mainly due to the successful prevention of the cake layer formation. CWF tests revealed that at the end of 180-hour operation, the reversible fouling (cake layer fouling) was only 13% of the overall fouling rate. The remaining 87% irreversible fouling was completely removed with a 2-hour chemical cleaning procedure using 500 ppm citric acid and NaClO achieving a final CFW of 1065 LMH/bar. The concentrated stream was able to produce enough energy in the AnMBR process to offset the DMF-AnMBR energy demand and be energy surplus for influent heating. Also, the integration of the DMF process was able to increase the overall efficiency of the AnMBR process from 78% to 96% during the CF10 operation.

TABLE 7

DMF-AnMBR operation DMF data

| DMF | CF3.3 | STDV | n | CF6.6 | STDV | n | CF10 | STDV | n |
|---|---|---|---|---|---|---|---|---|---|
| Feed tCOD, mg/L | 1000 | 86 | 28 | 1000 | 86 | 20 | 1000 | 86 | 15 |
| Feed sCOD, mg/L | 166 | 8 | 28 | 166 | 8 | 20 | 166 | 8 | 15 |
| Concentrate tCOD, mg/L | 1233 | 480 | 28 | 5672 | 1028 | 20 | 6928 | 951 | 15 |
| Concentrate sCOD, mg/L | 291 | 144 | 28 | 1113 | 175 | 20 | 1256 | 445 | 15 |
| Perm tCOD, mg/L | 114 | 36 | 28 | 170 | 56 | 20 | 216 | 29 | 15 |
| CBR TOP tCOD, mg/L | 223 | 112 | 28 | 209 | 36 | 20 | 324 | 34 | 15 |
| MFT tCOD, mg/L | 207 | 70 | 28 | 547 | 90 | 20 | 671 | 99 | 15 |
| Total feed volume, L | 477 | | | 803 | | | 1140 | | |
| Concentrate volume, L | 160 | | | 121 | | | 113 | | |
| Permeate volume, L | 318 | | | 682 | | | 1023 | | |
| Total run time, h | 34 | | | 63 | | | 84 | | |
| AVG flow rate, L/h | 9.4 | | | 10.8 | | | 12.2 | | |
| AVG effective flux, LMH | 40.5 | | | 47.2 | | | 46.4 | | |
| AVG TMP, bar | 0.06 | | | 0.09 | | | 0.14 | | |
| fouling rate, mbar/h | 0.16 | | | 0.77 | | | 0.63 | | |
| CF actual, by COD | 1.2 | 0.5 | NA | 5.7 | 1.0 | NA | 6.9 | 0.9 | NA |
| Total tCOD recovered, g | | | | 1666 | | | | | |
| Total treated WW, L | | | | 2420 | | | | | |
| Total run time, h | | | | 181 | | | | | |
| Total tCOD in the feed, g | 477 | 41 | 28 | 803 | 69 | 20 | 1140 | 98 | 15 |
| Total tCOD in the permeate, g | 36 | 12 | 28 | 116 | 38 | 20 | 221 | 29 | 15 |
| Total tCOD in the concentrate, g | 197 | 77 | 28 | 686 | 124 | 20 | 783 | 107 | 15 |
| tCOD lost to permeate, % | 7.6 | NA | | 14.4 | NA | | 19.4 | NA | |
| tCOD in the concentrate, % | 41 | NA | | 85 | NA | | 69 | NA | |
| tCOD retained in the system, % | 51.1 | NA | | 0.1 | NA | | 12.0 | NA | |
| tCOD lost to permeate, total % | | | | 15 | | | | | |
| tCOD in the concentrate, total % | | | | 69 | | | | | |

TABLE 7-continued

DMF-AnMBR operation DMF data

| DMF | CF3.3 | STDV | n | CF6.6 | STDV | n | CF10 | STDV | n |
|---|---|---|---|---|---|---|---|---|---|
| tCOD in the system, total % | | | | 16 | | | | | |
| tCOD rejection rate, % | 88.6 | 3.60 | 28 | 83.00 | 5.80 | 20 | 78.40 | 2.90 | 15 |
| Overall tCOD rejection rate, % | | | | 85.6 | | | | | |
| Concentrate TS, mg/L | 1330 | 423 | 4 | 4655 | 237 | 3 | 6748 | 1636 | 3 |
| Concentrate VS, mg/L | 1118 | 485 | 4 | 4392 | 401 | 3 | 6458 | 1546 | 3 |
| Concentrate pH | 6.9 | 0.4 | 4 | 6.1 | 0.03 | 3 | 5.9 | 0.1 | 3 |
| Concentrate ORP, mV | −212 | 57 | 4 | −243 | 28 | 3 | −247 | 21 | 3 |
| tTP influent, mg/L | 61.4 | 1.8 | 4 | 61.4 | 1.8 | 3 | 61.4 | 1.8 | 3 |
| sTP influent, mg/L | 14.8 | 1.6 | 4 | 14.8 | 1.6 | 3 | 14.8 | 1.6 | 3 |
| Total tTP influent, g | 29.3 | 0.9 | 4 | 49.3 | 1.4 | 3 | 70.0 | 2.1 | 3 |
| TP permeate, mg/L | 5.0 | 4.2 | 4 | 9.5 | 1.6 | 3 | 11.3 | 0.8 | 3 |
| Total tTP permeate, g | 1.6 | 1.3 | 4 | 6.5 | 1.1 | 3 | 11.6 | 0.9 | 3 |
| tTP concentrate, mg/L | 42 | 11 | 4 | 156 | 57 | 3 | 165 | 45 | 3 |
| sTP concentrate, mg/L | 9 | 8 | 4 | 25 | 1 | 3 | 38 | 3 | 3 |
| Total tTP concentrate, g | 6.7 | 1.7 | 4 | 18.8 | 6.9 | 3 | 18.6 | 5.1 | 3 |
| tTP lost to permeate, % | 2.6 | NA | | 10.6 | NA | | 18.8 | NA | |
| tTP in the concentrate, % | 22.9 | NA | | 38.2 | NA | | 26.6 | NA | |
| tTP retained in the system, % | 71.6 | NA | | 48.6 | NA | | 56.9 | NA | |
| tTP lost to permeate, total % | | | | 13 | | | | | |
| tTP in the concentrate, total % | | | | 30 | | | | | |
| tTP retained in the system, total % | | | | 43 | | | | | |
| tTP rejection rate, % | 91.9 | 6.8 | 4 | 84.5 | 2.6 | 3 | 81.6 | 1.4 | 3 |
| Overall tTP rejection rate, % | | | | 86.0 | | | | | |
| tTN influent, mg/L | 28 | 3 | 4 | 28 | 3 | 3 | 28 | 3 | 3 |
| sTN influent, mg/L | 6 | 0.8 | 4 | 6 | 0.8 | 3 | 6 | 0.8 | 3 |
| Total tTN influent, g | 13.4 | 1.4 | 4 | 22.5 | 2.4 | 3 | 31.9 | 3.4 | 3 |
| TN permeate, mg/L | 5.0 | 4.2 | 4 | 9.5 | 1.6 | 3 | 11.3 | 0.8 | 3 |
| Total tTN permeate, g | 1.6 | 1.3 | 4 | 6.5 | 1.1 | 3 | 11.6 | 0.9 | 3 |
| tTN concentrate, mg/L | 61 | 42 | 4 | 172 | 45 | 3 | 353 | 137 | 3 |
| sTN concentrate, mg/L | 7.5 | 5.3 | 4 | 14.6 | 9.0 | 3 | 37.2 | 12.9 | 3 |
| Total tTN concentrate, g | 9.8 | 6.7 | 4 | 20.8 | 5.5 | 3 | 39.9 | 15.4 | 3 |
| tTN lost to permeate, % | 5.7 | NA | | 23.2 | NA | | 41.3 | NA | |
| tTN in the concentrate, % | 73.2 | NA | | 92.6 | NA | | >100% | NA | |
| tTN retained in the system, % | 14.9 | NA | | <0% | | | <0% | | |
| tTN lost to permeate, total % | | | | 29 | | | | | |
| tTN in the concentrate, total % | | | | >100% | | | | | |
| tTN retained in the system, total % | | | | >100% | | | | | |
| tTN rejection rate, % | 84.2 | 12.2 | 4 | 74.5 | 13.3 | 3 | 66.7 | 16.5 | 3 |
| Overall tTN rejection rate, % | | | | 75.2 | | | | | |
| Reactor NH3, mg/L | 1.5 | 1.5 | 4 | 2.1 | 0.4 | 3 | 7.2 | 0.7 | 3 |
| Permeate NH3, mg/L | 2.8 | 3.6 | 4 | 0.9 | 0.9 | 3 | 5.5 | 1.1 | 3 |
| Concentrate centrate NH3, mg/L | 2.8 | 3.6 | 4 | 0.9 | 0.9 | 3 | 5.5 | 1.1 | 3 |
| Permeate turbidity, NTU | 0.2 | 0.1 | 28 | 0.2 | 0.1 | 20 | 0.3 | 0.2 | 15 |

TABLE 8

DMF-AnMBR operation AnMBR data

| Parameters | Startup | STD | n | CF3.3 | STD | n | CF6.6 | STD | n | CF10 | STD | n | Final | STD | n |
|---|---|---|---|---|---|---|---|---|---|---|---|---|---|---|---|
| Feed tCOD, mg/L | 1000 | 86 | 14 | 1233 | 480 | 27 | 5603 | 1055 | 20 | 6928 | 928 | 14 | 12694 | 1092 | 14 |
| Feed sCOD, mg/L | 166 | 8 | 14 | 291 | 144 | 27 | 1368 | 696 | 20 | 1252 | 429 | 14 | 2107 | 102 | 14 |
| OLR, gCOD/L-d | 0.53 | 0.02 | 90 | 0.71 | 0.53 | 27 | 2.59 | 0.53 | 20 | 3.24 | 0.45 | 14 | 4.18 | 1.07 | 14 |
| OLR, g VS/L-d | 0.33 | 0.01 | 90 | 0.41 | 0.17 | 4 | 1.98 | 0.23 | 3 | 2.98 | 0.85 | 3 | 3.07 | 0.69 | 14 |
| Reactor tCOD, mg/L | 11044 | 3557 | 6 | 10496 | 1847 | 4 | 12447 | 2253 | 3 | 17514 | 2074 | 3 | 36033 | 9864 | 2 |
| Reactor sCOD, mg/L | 930 | 154 | 6 | 734 | 236 | 4 | 1101 | 104 | 3 | 1968 | 1095 | 3 | 8598 | 1464 | 2 |
| Perm tCOD, mg/L | 219 | 22 | 6 | 90 | 19 | 4 | 349 | 48 | 3 | 349 | 25 | 3 | 2374 | 1045 | 2 |
| Perm TOC, mg/L | 211 | 24 | 6 | 115 | 23 | 4 | 369 | 49 | 3 | 341 | 26 | 3 | 1206 | 387 | 2 |
| COD Removal, % | 78 | | 6 | 91 | | 4 | 93 | | 3 | 96 | | 3 | 81 | | 2 |
| Overall COD Removal, % | | | | | | | 87.8 | | | | | | | | |
| Reactor tTP, mg/L | 1384 | 459 | 6 | 1414 | 267 | 4 | 1357 | 357 | 3 | 1521 | 208 | 3 | 2135 | 396 | 2 |
| Reactor sTP, mg/L | 37 | 7 | 6 | 33 | 16 | 4 | 43 | 6 | 3 | 70 | 9 | 3 | 357 | 70 | 2 |

TABLE 8-continued

DMF-AnMBR operation AnMBR data

| Parameters | Startup | STD | n | CF3.3 | STD | n | CF6.6 | STD | n | CF10 | STD | n | Final | STD | n |
|---|---|---|---|---|---|---|---|---|---|---|---|---|---|---|---|
| Feed tTP, mg/L | 61 | 2 | 6 | 42 | 11 | 4 | 156 | 57 | 3 | 165 | 45 | 3 | 780 | 23 | 2 |
| Feed sTP, mg/L | 15 | 2 | 6 | 9 | 8 | 4 | 25 | 1 | 3 | 38 | 3 | 3 | 219 | 20 | 2 |
| Perm tTP, mg/L | 10 | 2 | 6 | 8 | 2 | 4 | 23 | 8 | 3 | 33 | 5 | 3 | 179 | 42 | 2 |
| TP Removal, % | 84 | | 6 | 79 | | 4 | 83 | | 3 | 79 | | 3 | 77 | | 2 |
| Feed tTN, mg/L | 28 | 3 | 6 | 61 | 42 | 4 | 172 | 45 | 3 | 353 | 137 | 3 | 355 | 38 | 2 |
| Feed sTN, mg/L | 6 | 1 | 6 | 8 | 5 | 4 | 15 | 9 | 3 | 37 | 13 | 3 | 76 | 10 | 2 |
| Reactor tTN, mg/L | 474 | 280 | 6 | 802 | 284 | 4 | 833 | 282 | 3 | 975 | 202 | 3 | 2300 | 448 | 2 |
| Reactor sTN, mg/L | 116 | 28 | 6 | 108 | 53 | 4 | 209 | 72 | 3 | 320 | 72 | 3 | 1003 | 350 | 2 |
| Perm TN, mg/L | 49 | 10 | 6 | 41 | 12 | 4 | 129 | 41 | 3 | 249 | 32 | 3 | 572 | 124 | 2 |
| TN Removal, % | | NA | | | NA | | | NA | | | NA | | | NA | |
| Reactor $NH_3$, mg/L | 68 | 7 | 6 | 50 | 29 | 4 | 128 | 39 | 3 | 270 | 28 | 3 | 569 | 107 | 2 |
| Permeate $NH_3$, mg/L | 46 | 9 | 6 | 35 | 10 | 4 | 116 | 26 | 3 | 246 | 32 | 3 | 542 | 112 | 2 |
| Perm Turbidity, NTU | 4.0 | 0.7 | 6.0 | 1.9 | 1.7 | 4.0 | 2.9 | 1.0 | 3.0 | 2.8 | 0.4 | 3.0 | 11.7 | 4.9 | 2 |
| TMP, bar | 0.04 | 0.02 | NA | 0.13 | 0.03 | NA | 0.24 | 0.03 | NA | 0.30 | 0.03 | NA | 0.42 | 0.05 | NA |
| Fouling rate, mbar/h | | 0.035 | | | 0.092 | | | 0.072 | | | 0.153 | | | 0.256 | |
| Reactor TSS, mg/L | 10208 | 3554 | 6 | 10972 | 1875 | 4 | 10804 | 2426 | 3 | 13159 | 1281 | 3 | 20824 | 5717 | 2 |
| Reactor VSS, mg/L | 6559 | 2154 | 6 | 7253 | 928 | 4 | 7470 | 1419 | 3 | 8597 | 929 | 3 | 14524 | 4339 | 2 |
| Reactor pH | 6.9 | 0.1 | 6 | 6.7 | 0.1 | 4 | 7.1 | 0.1 | 3 | 7.1 | 0.2 | 3 | 7.3 | 0.1 | 2 |
| Reactor ORP, mV | −341.2 | 19.4 | 6 | −335.4 | 6.0 | 4 | −348.3 | 9.8 | 3 | −338.3 | 16.4 | 3 | −322.1 | 0.6 | 2 |
| Daily biogas production, L | 1.44 | 0.45 | 46 | 2.33 | 0.40 | 29 | 9.02 | 1.59 | 19 | 14.01 | 1.81 | 16 | 23.74 | 4.07 | 14 |
| Biogas methane content, % | 71.4 | 1.7 | 6 | 72.9 | 2.7 | 4 | 67.4 | 2.9 | 3 | 66.9 | 3.0 | 3 | 53.9 | 10.0 | 2 |
| Daily methane production, L | 1.0 | 0.3 | 46 | 1.7 | 0.3 | 29 | 6.1 | 1.1 | 19 | 9.4 | 1.2 | 16 | 12.8 | 2.2 | 14 |
| Daily methane production, L $CH_4$/g COD | 0.142 | 0.070 | 6 | 0.209 | 0.019 | 4 | 0.188 | 0.052 | 3 | 0.269 | 0.059 | 3 | 0.272 | 0.067 | 2 |
| Overall methane production, L $CH_4$/g COD | | | | | | | 0.218 ± 0.05 | | | | | | | | |

TABLE 9

DMF-AnMBR operation energy balance

| | | | | DMF-AnMBR Base Energy, kWh | Energy Production | | | Direct Heating | | Perm. Heat Pump Util. | | No influent heating | |
|---|---|---|---|---|---|---|---|---|---|---|---|---|---|---|
| Influent Temperature, °C | Direct heating, kWh | Heat pump utilization, kWh | Energy loss, kWh | | Energy Value, kWh | % 33 CHP, kWh | % 83 CHP, kWh | % 33 CHP, kWh | % 83 CHP, kWh | % 33 CHP, kWh | % 83 CHP, kWh | %33 CHP, kWh | %83 CHP, kWh |
| 200 L/No DMF | | | | | | | | | | | | | |
| 10 | 5.80 | 1.45 | 0.48 | 0.17 | 0.33 | 0.07 | 0.18 | −6.38 | −6.27 | −2.03 | −1.92 | −0.58 | −0.47 |
| 20 | 3.48 | 0.87 | 0.29 | 0.17 | 0.33 | 0.07 | 0.18 | −3.86 | −3.76 | −1.25 | −1.15 | −0.38 | −0.28 |
| 25 | 2.32 | 0.58 | 0.19 | 0.17 | 0.33 | 0.07 | 0.18 | −2.61 | −2.50 | −0.87 | −0.76 | −0.29 | −0.18 |
| 30 | 1.16 | 0.29 | 0.10 | 0.17 | 0.33 | 0.07 | 0.18 | −1.35 | −1.24 | −0.48 | −0.37 | −0.19 | −0.08 |
| 1000 L/No DMF | | | | | | | | | | | | | |
| 10 | 29.00 | 7.25 | 0.48 | 0.19 | 1.65 | 0.35 | 0.89 | 29.32 | 28.78 | −7.57 | −7.03 | −0.32 | 0.22 |
| 20 | 17.40 | 4.35 | 0.29 | 0.19 | 1.65 | 0.35 | 0.89 | 17.53 | 16.99 | −4.48 | −3.94 | −0.13 | 0.41 |
| 25 | 11.60 | 2.90 | 0.19 | 0.19 | 1.65 | 0.35 | 0.89 | 11.63 | 11.10 | −2.93 | −2.40 | −0.03 | 0.50 |
| 30 | 5.80 | 1.45 | 0.10 | 0.19 | 1.65 | 0.35 | 0.89 | −5.73 | −5.20 | −1.38 | −0.85 | 0.07 | 0.60 |
| 200 L/DMF-AnMBR | | | | | | | | | | | | | |
| 10 | 5.80 | 1.45 | 0.48 | 0.30 | 3.11 | 0.66 | 1.67 | −5.92 | −4.92 | −1.57 | −0.57 | −0.12 | 0.88 |
| 20 | 3.48 | 0.87 | 0.29 | 0.30 | 3.11 | 0.66 | 1.67 | −3.41 | −2.40 | −0.80 | 0.21 | 0.07 | 1.08 |
| 25 | 2.32 | 0.58 | 0.19 | 0.30 | 3.11 | 0.66 | 1.67 | −2.15 | −1.15 | −0.41 | 0.59 | 0.17 | 1.17 |
| 30 | 1.16 | 0.29 | 0.10 | 0.30 | 3.11 | 0.66 | 1.67 | −0.90 | 0.11 | −0.03 | 0.98 | 0.26 | 1.27 |

TABLE 9-continued

DMF-AnMBR operation energy balance

1000 L/DMF-AnMBR

| | | | | | | | | | | | | |
|---|---|---|---|---|---|---|---|---|---|---|---|---|
| 10 | 29.00 | 7.25 | 0.48 | 0.35 | 15.54 | 3.31 | 8.33 | 26.51 | 21.49 | -4.76 | 0.39 | 2.49 | 7.51 |
| 20 | 17.40 | 4.35 | 0.29 | 0.35 | 15.54 | 3.31 | 8.33 | 14.72 | -9.70 | -1.67 | 3.48 | 2.68 | 7.70 |
| 25 | 11.60 | 2.90 | 0.19 | 0.35 | 15.54 | 3.31 | 8.33 | -8.82 | -3.80 | -0.12 | 5.03 | 2.78 | 7.80 |
| 30 | 5.80 | 1.45 | 0.10 | 0.35 | 15.54 | 3.31 | 8.33 | -2.93 | 2.09 | 1.42 | 6.57 | 2.87 | 7.89 |

The present disclosure provides a wastewater treatment system and methods of using the same that is flexible for handling a wide range of hydraulic conditions and compositions, energy positive to a point where the embedded energy in the WW is enough to accommodate the background energy for the entire treatment process, and capable of nutrient recovery in a smaller foot print. In the end, a physical separation process (DMF) was developed and successfully implemented either as a standalone up-concentration and recovery process or with the integration of an AnMBR system for increased energy production from dilute WW. Throughout the testing, the DMF process was able to reduce the incoming WW volume by 10 times and create a high strength stream suitable for efficient AnMBR process. It was found that 69% of the incoming COD was concentrated in the concentrate stream for the CF10 operation. By improving the DMF process with several design iterations, it was demonstrated that this can be accomplished without compromising the membrane performance at reduced energy demands. The AnMBR process also showed promising results. By integrating the DMF system, the biogas production rate was increased 9.7 times with the throughput and the removal efficiency of the AnMBR process was increased from 78% to 96%. This increase in the biogas production is enough to offset all energy demand for the entire system and provide extra energy for additional processes.

The following advantages were observed from the examples. External cross flow filtration was successful for preventing the cake layer formation. CWF tests determined that at the end of 180 h DMF operation, the reversible fouling was only 13% while the irreversible fouling was 87% of the overall fouling rates. A 2-hour long chemical cleaning with 500 PPM citric acid and 500 PPM NaClO successfully removed all irreversible fouling achieving a final CWF of 1065 LMH/bar. No flux decline was observed during the 180 h DMF operation and an average flux of 44.5 LMH was achieved. This was due, in part, to the successful prevention of the cake layer formation.

An overall TMP of 0.10 bar was achieved during the 180 h DMF operation. The average fouling rate of 0.52 mbar/h was quite lower compared to the reported values in the literature especially while running the DMF process at higher fluxes. The TMP profile and fouling rates were also similar to our previous 117-hour operation, which achieved a TMP and fouling rate of 0.09 bar and 0.61 mbar/h, respectively.

The DMF process showed an excellent performance and achieved an overall COD rejection of 85.6% for the entire operation (88.6%, 83%, and 78.4% for CF3.3, CF6.6, and CF10, respectively). Organics recovery in terms of tCOD was also successful and achieved a 69% recovery rate. This means that only 15% of the incoming tCOD lost to the permeate while 16% was retarded in the DMF system as deposits and cake foulants.

Significant TP and TN rejection rates were also achieved with an 86% overall rejection for TP (91.9% for CF3.3, 84.5% for CF6.6, and 81.6% for CF10) and an 75% overall rejection for TN (84.2% for CF3.3, 74.5% for CF6.6, and 66.7% for CF10), respectively.

The reactor achieved an 87.8% overall COD removal efficiency with an average permeate tCOD of 252 mg/L. During the DMF integration, AnMBR removal efficiencies were 91%, 93%, and 96% for CF3.3, CF6.6, and CF10, respectively. On average, biogas production increased 1.6, 6.3, and 9.7 times when DMF concentrate stream was fed into the AnMBR during these cycles. Compared to the startup, removal efficiency was 18% higher during the CF10 operation.

Influent tCOD and biogas production also showed a good linearity at an $R^2$ of 0.92.

AnMBR instantaneous flux was stable during the first 120-hour operation. With the beginning of CF10 stage, a slight decrease to 3.5 LMH was observed. An overall effective flux and TMP of 3.2±0.5 LMH and 0.23±0.13 bar was achieved during the entire operation.

As a result of high strength influent from DMF process, AnMBR produced 14.01 L biogas/day (9.4 L $CH_4$/day) at 0.269 L $CH_4$/g COD specific methane production during the CF10 cycle. The potential energy from the methane at this production rate was calculated as 15.54 kWh/m$^3$ when the AnMBR was fed at 1000 L/day with the CF10 concentrate stream. This corresponded to 3.31 kWh at 21% conversion efficiency with a CHP system which was enough to offset the background energy demand for the DMF-AnMBR system and influent heating at 10° C. to 35° C. when a permeate heat pump technology was incorporated.

The invention has been described according to one or more preferred embodiments, and it should be appreciated that many equivalents, alternatives, variations, and modifications, aside from those expressly stated, are possible and within the scope of the invention.

We claim:

1. A wastewater treatment system comprising:
   a settling tank including: an inlet configured to receive an inlet wastewater stream;
   a plurality of baffles or tubes disposed in an interior space of the settling tank;
   a solids outlet disposed near a bottom end of the settling tank; and
   a supernatant outlet disposed above the solids outlet;
   a membrane feed tank including:
   an inlet configured to receive all or a portion of supernatant liquid from the settling tank supernatant outlet;
   a solids outlet disposed near a bottom end of the membrane feed tank; and
   a fluid outlet disposed above the solids outlet;
   wherein the supernatant liquid passes through the fluid outlet; and, a first filtration unit including: a filtration inlet configured to receive all or a portion of supernatant liquid from the membrane feed tank; and, porous filtration media disposed to separate the filtration unit into a permeate side that allows permeate to exit the filtration unit through a permeate outlet and a retentate side that allows retentate to exit the filtration unit through a retentate outlet; and wherein the wastewater treatment system further comprises a configuration wherein the membrane feed tank further includes a second fluid inlet configured and fluidly connected to receive all or a portion of the retentate from the filtration unit retentate outlet.

2. The wastewater treatment system of claim 1 further comprising an anaerobic membrane bioreactor system, the anaerobic membrane bioreactor system comprising:

an anaerobic bioreactor including:
an inlet configured to receive a concentrate stream exiting the settling tank or the membrane feed tank, wherein the anaerobic bioreactor comprises microbes that break down biodegradable material in the concentrate stream to produce a biogas;
a gas outlet configured to allow the biogas to exit the anaerobic bioreactor; and,
a fluid outlet configured to allow fluid to exit the anaerobic bioreactor; and, a second filtration unit including:
a membrane inlet configured to receive the fluid from the anaerobic bioreactor; and,
porous filtration media disposed to define a permeate region of the filtration unit that allows permeate to exit the filtration unit through a permeate outlet and a retentate region of the filtration unit that allows retentate to exit the filtration unit through a retentate outlet, and wherein the retentate is recycled from the second filtration unit back to the anaerobic bioreactor through the membrane inlet.

3. The wastewater treatment system of claim 2, wherein the porous filtration media of the first filtration unit and the second filtration unit are membrane filters.

4. The wastewater treatment system of claim 3, wherein the membrane filters are microfiltration membranes having pores from 0.05 to 10 um.

5. The wastewater treatment system of claim 3, wherein the membrane filters are ultrafiltration membranes having pores from 5 to 100 nm.

6. The wastewater treatment system of claim 2, further comprising an algae photobioreactor configured to cultivate algae and fluidly connected for using the permeate from the first filtration unit or the second filtration unit.

7. The wastewater treatment system of claim 1, further comprising a sedimentation reagent unit comprising a vessel that contains a flocculent, a coagulant, a polyelectrolyte, or a combination thereof; and a pump configured to place the vessel in fluid communication with the settling tank or the membrane feed tank.

8. The wastewater treatment system of claim 1, further comprising a scouring reagent unit comprising a vessel that contains a scouring agent and a pump configured to place the vessel in fluid communication with the settling tank or the membrane feed tank.

9. The wastewater treatment system of claim 1, wherein the plurality of baffles or tubes in the settling tank are concentric baffles or tubes.

10. The wastewater treatment system of claim 1, wherein the plurality of baffles or tubes in the settling tank are Lamella baffles or tubes.

11. The wastewater treatment system of claim 1, wherein the settling tank or membrane feed tank includes an electrocoagulation unit that produces coagulants through electrolytic oxidation.

12. A method for treating wastewater, the method comprising:

(i) feeding wastewater to a settling tank that separates the wastewater into a concentrate stream and a supernatant stream, wherein the concentrate stream exits the settling tank through a solids outlet disposed near a bottom end of the settling tank, and wherein the supernatant stream exits the settling tank through a supernatant outlet disposed above the solids outlet:

(ii) feeding the supernatant stream to a membrane feed tank that separates the supernatant stream into a second concentrate stream and a second supernatant stream, wherein the second concentrate stream exits the membrane feed tank through a solids outlet disposed near a bottom end of the membrane feed tank and wherein the supernatant stream exits the membrane feed tank through a fluid outlet disposed above the solids outlet; and (iii) feeding the second supernatant stream to a filtration unit comprising porous filtration media that separates the second supernatant stream into a permeate stream and a retentate stream, wherein the retentate stream exiting the filtration unit is recycled back to the membrane feed tank;

further comprising feeding the concentrate streams exiting the settling unit and the membrane feed tank to an anaerobic bioreactor having microorganisms that break down organic material to produce a biogas.

13. The method of claim 12, further comprising feeding fluid treated in the anaerobic bioreactor to a second filtration unit comprising porous filtration media that separates the fluid into a permeate stream and a retentate stream, wherein the retentate stream exiting the second filtration unit is recycled back to the anaerobic bioreactor.

* * * * *